US012659423B2

(12) United States Patent
Wei et al.

(10) Patent No.: US 12,659,423 B2
(45) Date of Patent: Jun. 16, 2026

(54) DATA TRANSMISSION METHOD AND APPARATUS

(71) Applicant: HUAWEI TECHNOLOGIES CO., LTD., Shenzhen (CN)

(72) Inventors: Zhigui Wei, Shenzhen (CN); Jiandong Ke, Shanghai (CN); Zhenxing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 389 days.

(21) Appl. No.: 18/361,698

(22) Filed: Jul. 28, 2023

(65) Prior Publication Data

US 2023/0379434 A1     Nov. 23, 2023

Related U.S. Application Data

(63) Continuation of application No. PCT/CN2021/074520, filed on Jan. 29, 2021.

(51) Int. Cl.
*H04N 7/04*       (2006.01)
*H04N 21/472*   (2011.01)

(52) U.S. Cl.
CPC ............. *H04N 7/04* (2013.01); *H04N 21/472* (2013.01)

(58) Field of Classification Search
CPC ....................................................... H04N 7/04
See application file for complete search history.

(56) References Cited

U.S. PATENT DOCUMENTS

| 8,879,895 | B1 | 11/2014 | Bussières | |
|---|---|---|---|---|
| 2012/0008044 | A1* | 1/2012 | Nagata | H04N 21/4305 |
| | | | | 348/478 |
| 2012/0075526 | A1* | 3/2012 | DeHaan | H04N 21/431 |
| | | | | 348/E7.003 |

FOREIGN PATENT DOCUMENTS

| CN | 106101739 | A | 11/2016 |
|---|---|---|---|
| JP | 2009284447 | A | 12/2009 |
| WO | 0064156 | A1 | 10/2000 |

OTHER PUBLICATIONS

International Search Report and Written Opinion in International Appln. No. PCT/CN2021/074520, mailed on Oct. 13, 2021, 17 pages (with English translation).

* cited by examiner

*Primary Examiner* — Michael H Hong
(74) *Attorney, Agent, or Firm* — Fish & Richardson P.C.

(57) ABSTRACT

This application discloses a data transmission method and apparatus, and relates to the field of media technologies. The method includes: obtaining video data of a to-be-transmitted video; splitting first line video data in the video data into a plurality of video data packets; and transmitting the plurality of video data packets and at least one auxiliary data packet in a first line active area.

20 Claims, 10 Drawing Sheets

| ... | Time period 11 | Time period 12 | Time period 13 | Time period 14 | ... | Time period 15 | Time period 16 | ... |
|-----|----------------|----------------|----------------|----------------|-----|----------------|----------------|-----|

DATA TRANSMISSION METHOD AND APPARATUS

CROSS-REFERENCE TO RELATED APPLICATIONS

This application is a continuation of International Application No. PCT/CN2021/074520, filed on Jan. 29, 2021, the disclosure of which is hereby incorporated by reference in its entirety.

TECHNICAL FIELD

This application relates to the field of media technologies, and in particular, to a data transmission method and apparatus.

BACKGROUND

Basic elements of media content include video data and audio data. Therefore, it is a basic function of a media interface to support transmission of video data and audio data at the same time. Currently, mainstream media interfaces include a high definition multimedia interface (high definition multimedia interface, HDMI) and a display port (display port, DP). Both the HDMI interface and the DP interface can transmit the video data and the audio data through a time-division multiplexing transmission link. In this way, the video data and the audio data can be transmitted.

However, in an existing media interface technology, the audio data can only be transmitted in a blanking (blanking) area generated in a video data transmission process. In other words, transmission of the audio data depends heavily on a size of the blanking area generated in the video data transmission process. When the blanking area is small, transmission of audio data with a high sampling frequency cannot be supported, in other words, transmission of audio data with a large data volume cannot be supported. This reduces user experience.

In view of this, how to improve user experience in a process of transmitting the video data and the audio data is an urgent technical problem to be resolved in the conventional technology.

SUMMARY

This application provides a data transmission method and apparatus. According to the method, transmission of auxiliary data including audio data can no longer depend on a size of a blanking area generated in a video data transmission process, and user experience is further improved.

To achieve the foregoing objective, this application provides the following technical solutions.

According to a first aspect, this application provides a data transmission method. The method includes: obtaining video data of a to-be-transmitted video; splitting first line video data in the video data into a plurality of video data packets; and transmitting the plurality of video data packets and at least one auxiliary data packet in a first line active area. The video data is data of an image frame of the to-be-transmitted video, the first line video data is any piece of line video data in the video data, the first line active area is a line active area corresponding to the first line video data, and the auxiliary data packet includes data other than the video data of the to-be-transmitted video.

By using the data transmission method provided in this application, auxiliary data may be transmitted in a line active area in which the video data is transmitted. In this way, transmission of the auxiliary data no longer depends on a blanking area. Therefore, according to the method provided in this application, transmission of high-quality auxiliary data may be supported in any video format scenario, and user experience may be further improved.

For example, that the auxiliary data is audio data is used as an example. When a video format of the to-be-transmitted video is a video graphics array (video graphics array, VGA), and the to-be-transmitted video is a VGA video with a resolution of 640×480p, because a blanking area corresponding to the video format is small, only audio data with a maximum of 2 audio channels and a sampling frequency of 192 kHz can be transmitted. In this case, in the video format and the resolution, a user cannot experience a high-quality audio effect.

However, according to the method provided in this application, the audio data may be transmitted not only in the blanking area, but also in a line active area. In other words, a time period for transmitting the audio data increases. Therefore, the method in this application can support transmission of audio data with a higher sampling frequency. That is, higher audio quality may be provided for the user, and user experience may be further improved.

In a possible design, the auxiliary data packet is obtained based on the auxiliary data. The auxiliary data includes at least one of the audio data, audio rendering data, data related to rendering of the image frame of the to-be-transmitted video, remote control data, subtitle data, bullet comment data, special effect data, or logo data.

It should be understood that the audio rendering data is used to render audio corresponding to the audio data. The data related to rendering of the image frame of the to-be-transmitted video is used to render the image frame of the video to obtain different display effects, for example, adjusting brightness and/or contrast of the entire image frame of the video or adjusting brightness and/or contrast of a partial area of the image frame of the video. The remote control data is used to remotely operate a video image frame of the video. For example, a game video on a mobile phone is projected to a television, and data used to control a game page on the television through a key of the phone is the remote control data. The logo data is used to display a logo on the image frame of the video. Details are not described.

In another possible design, the transmitting the plurality of video data packets and at least one auxiliary data packet in a first line active area specifically includes: transmitting, according to a scheduling rule, the plurality of video data packets and the at least one auxiliary data packet in the first line active area. The scheduling rule indicates a sending sequence of the plurality of video data packets and the at least one auxiliary data packet.

In another possible design, the scheduling rule includes a priority scheduling rule or a round robin scheduling rule.

According to the two possible designs, the data transmission apparatus may send the video data packet and the auxiliary data packet according to the scheduling rule. For example, the video data packet and the auxiliary data packet are sequentially sent based on priorities of the video data and the auxiliary data, or the video data packet and the auxiliary data packet are sequentially sent according to the round robin rule. In this way, transmission of the auxiliary data no longer depends on the blanking area. However, the auxiliary data may be sent at any time point including the blanking area, for example, sending in the line active area.

For example, when the data transmission apparatus sends the video data packet and the auxiliary data packet by using the round robin rule, the data apparatus may sequentially send the video data packet and the auxiliary data packet based on a sending sequence of the video data packet→the auxiliary data packet, and repeatedly perform the sending process. Alternatively, the data transmission apparatus may sequentially send j video data packets and k auxiliary data packets based on a sequence of the j video data packets→the k auxiliary data packets, and repeatedly perform this process. j and k are integers greater than 1.

In addition, when the video data packet and the auxiliary data packet are evenly scheduled and sent according to the scheduling rule, according to the method provided in this application, an auxiliary packet can be transmitted to a data receiving apparatus at an even sending frequency. In this way, a requirement for performance of the data receiving apparatus to receive and process data is reduced.

In another possible design, the video data packet includes a first type identifier indicating that a type of data in the video data packet is video data.

In another possible design, the auxiliary data packet includes a second type identifier indicating that a type of data in the auxiliary data packet is auxiliary data.

According to the two possible implementations, the data transmission apparatus identifies a type of data in a data packet by using a type identifier. In this way, a data receive end can determine a type of data in a received data packet based on the type identifier, to implement accurate receiving and outputting of the data.

In another possible design, the method further includes: transmitting the auxiliary data packet in a line blanking area before or after the first line active area, and/or transmitting the auxiliary data packet in a field blanking area between two image frames of the to-be-transmitted video.

According to the possible design, in the method provided in this application, the auxiliary data packet may be transmitted in a line blanking area between the first line active area and a second line active area, and/or the auxiliary data packet may be transmitted in the field blanking area between the two image frames of the to-be-transmitted video. The second line active area is a line active area corresponding to a previous piece of line video data or a next piece of line video data of the first line video data.

In this way, the transmission of the auxiliary data no longer depends on the blanking area. In addition, the auxiliary data may be transmitted not only in the blanking area, but also in the line active area. Therefore, the auxiliary data is usually not cached in a buffer of a data transmit end for a long time. In other words, according to the method provided in this application, a requirement for a cache size of a data sending apparatus is reduced. In addition, because the auxiliary data packet is not accumulated in the buffer of the data transmit end for a long time, the auxiliary data packet is not sent to the data receive end in an explosive manner (that is, sending frequency is high) in a window where the auxiliary data packet is allowed to be sent. In this way, a requirement for performance of the data receiving apparatus to receive and process data is reduced.

In another possible design, the splitting first line video data in the video data into a plurality of video data packets specifically includes: splitting, based on a preset length, the first line video data into the plurality of video data packets, or splitting the first line video data into a preset quantity of video data packets.

According to the possible design, in this application, line video data may be split in a plurality of implementations, the auxiliary data may be sent in a line active area corresponding to the line video data, so that the transmission of the auxiliary data no longer depends on the blanking area.

In another possible design, before the transmitting the plurality of video data packets and at least one auxiliary data packet in a first line active area, the method further includes: separately encoding and encapsulating the plurality of video data packets and the auxiliary data packet.

According to a second aspect, this application provides a data transmission method. The method includes: receiving a plurality of data packets in a first line active area; and determining, based on a type identifier of a first data packet, whether the first data packet is a video data packet or an auxiliary data packet. The plurality of data packets include a plurality of video data packets and at least one auxiliary data packet, the plurality of video data packets are obtained by splitting first line video data, the first line video data is any piece of line video data in video data of a to-be-received video, the video data is data of an image frame of the to-be-received video, the first line active area is a line active area corresponding to the first line video data, the auxiliary data packet includes data other than the video data in the to-be-received video, and the first data packet is any data packet in the plurality of data packets.

In a possible design manner, the "determining, based on a type identifier of a first data packet, whether the first data packet is a video data packet or an auxiliary data packet" specifically includes: if the type identifier is a first type identifier, determining that the first data packet is a video data packet; and if the type identifier is a second type identifier, determining that the first data packet is the auxiliary data packet. The first type identifier indicates that a type of data in the data packet is video data, and the second type identifier indicates that a type of data in the data packet is auxiliary data.

In another possible design, the method further includes: storing the plurality of video data packets in a video data cache space, and storing the at least one auxiliary data packet in an auxiliary data cache space.

In another possible design, the method further includes: displaying data in the video data packet by using a display screen; playing audio corresponding to data in the auxiliary data packet by using an audio module; or displaying content corresponding to data in the auxiliary data packet by using a display screen.

It may be understood that for beneficial effects of the technical solutions provided in the second aspect and any possible design of the second aspect, refer to beneficial effects of the technical solutions provided in the first aspect and any possible design of the first aspect. Details are not described again.

According to a third aspect, this application provides a data transmission apparatus.

In a possible design, the data transmission apparatus is configured to perform any method provided in the first aspect. In this application, the data transmission apparatus may be divided into functional modules according to any method provided in the first aspect. For example, each function module may be obtained through division based on a corresponding function, or two or more functions may be integrated into one processing module. For example, in this application, the data transmission apparatus may be divided into an obtaining unit, a processing unit, a transmission unit, and the like based on functions. For descriptions of possible technical solutions performed by the foregoing functional modules obtained through division and beneficial effects, refer to the technical solutions provided in the first aspect or corresponding possible designs of the first aspect. Details are not described herein again.

In another possible design, the data transmission apparatus includes one or more processors and a transmission interface. The one or more processors receive or send data by using the transmission interface. The one or more processors are configured to invoke program instructions stored in a memory, to enable the data transmission apparatus to perform any method provided in the first aspect and any possible design of the first aspect.

According to a fourth aspect, this application provides a data transmission apparatus.

In a possible design, the data transmission apparatus is configured to perform any method provided in the second aspect. In this application, the data transmission apparatus may be divided into functional modules according to any method provided in the second aspect. For example, each function module may be obtained through division based on a corresponding function, or two or more functions may be integrated into one processing module. For example, in this application, the data transmission apparatus may be divided into a receiving unit, a determining unit, and the like based on functions. For descriptions of possible technical solutions performed by the foregoing functional modules obtained through division and beneficial effects, refer to the technical solutions provided in the second aspect or corresponding possible designs of the second aspect. Details are not described herein again.

In another possible design, the data transmission apparatus includes one or more processors and a transmission interface. The one or more processors receive or send data by using the transmission interface. The one or more processors are configured to invoke program instructions stored in a memory, to enable the data transmission apparatus to perform any method provided in the second aspect and any possible design of the second aspect.

According to a fifth aspect, this application provides a computer-readable storage medium. The computer-readable storage medium includes program instructions. When the program instructions are run on a computer or a processor, the computer or the processor is enabled to perform any method provided in any possible implementation of the first aspect or the second aspect.

According to a sixth aspect, this application provides a computer program product. When the computer program product is run on a data transmission apparatus, any method provided in any possible implementation of the first aspect or the second aspect is performed.

According to a seventh aspect, this application provides a chip system, including a processor. The processor is configured to invoke, from a memory, a computer program stored in the memory and run the computer program, to perform any method provided in the implementations of the first aspect or the second aspect.

It may be understood that any apparatus, computer storage medium, computer program product, chip system, or the like provided above may be applied to a corresponding method provided above. Therefore, for a beneficial effect that can be achieved by any apparatus, computer storage medium, computer program product, chip system, or the like, refer to a beneficial effect in a corresponding method. Details are not described herein again.

In this application, a name of the foregoing data transmission apparatus does not constitute any limitation to devices or functional modules. In an actual implementation, these devices or functional modules may have other names. Each device or functional module falls within the scope defined by the claims and their equivalent technologies in this application, provided that a function of the device or functional module is similar to that described in this application.

These aspects or other aspects in this application are more concise and comprehensible in the following descriptions.

DESCRIPTION OF EMBODIMENTS

To better understand embodiments of this application, the following describes some terms or technologies used in embodiments of this application.

(1) Blanking Area

When a data transmit end transmits source data of a video through a media interface, a transmission time sequence of the source data of the video includes an active area and the blanking area.

In the active area, data transmitted by the data transmit end through the media interface is active video data. Herein, the active video data is data of an image frame of the transmitted video, namely, data that can be displayed on a display screen. For brief description, the active video data is referred to as video data for short below.

Generally, the active area corresponding to the video data includes a plurality of line active areas. Any line active area of the plurality of line active areas is a time period for transmitting a piece of line video data in the video data. It can be learned that a piece of line video data corresponds to a line active area.

The line video data in the video data corresponds to a line pixel of an image displayed on the display screen.

In the blanking area, data transmitted by the data transmit end through the media interface is inactive video data, in other words, data transmitted in the blanking area cannot be displayed as a pixel on the display screen.

Generally, the blanking area includes a line blanking area and a field blanking area.

The line blanking area may also be referred to as a horizontal blanking (Horizontal blanking) area. The line blanking area generally is a time period between two line active areas corresponding to two pieces of line video data. Alternatively, it may be understood that a time period after a line active area corresponding to a piece of line video data and before a line active area corresponding to a previous piece of line video data or a next piece of line video data of the line video data may be referred to as the line blanking area.

It may be understood that, in a process in which the data transmit end transmits the video data through the media interface, a plurality of line blanking areas are generated. It should be understood that duration of the plurality of line blanking areas may be the same or different.

The field blanking area may also be referred to as a vertical blanking (vertical blanking) area. The field blanking area generally is a time period between video data that corresponds to two image frames of a video that are separately transmitted by the data transmit end through the media interface. Generally, duration of the field blanking area is greater than that of the line blanking area.

It should be understood that a length of the blanking area is generally related to a video playing format. The length of the blanking area varies based on the video playing format.

Figures 1A, 1B:
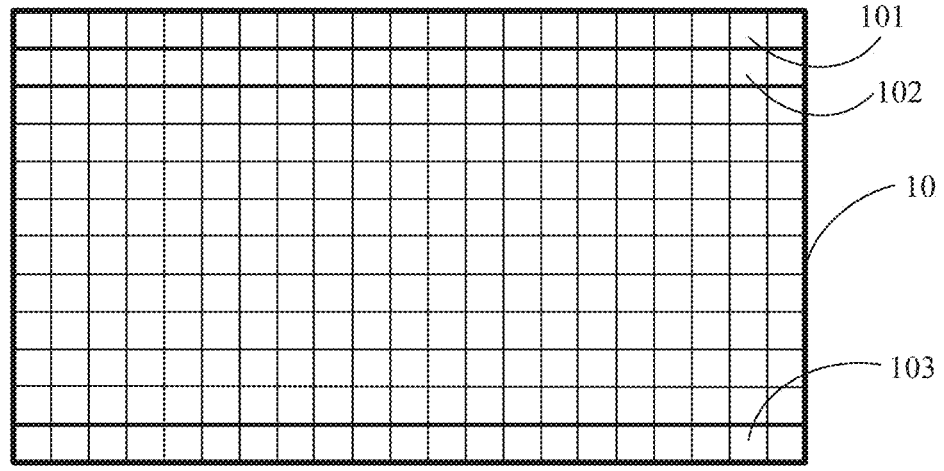
FIG. 1a is a schematic diagram of an image frame of a video according to an embodiment of this application.
FIG. 1B is a schematic diagram of a line blanking area and a field blanking area according to an embodiment of this application.

FIG. 1a is a schematic diagram of an image frame of a video.

As shown in FIG. 1a, an image 10 represents any image frame of a to-be-transmitted video. A pixel line 101 of the image 10 is a piece of line video data.

With reference to FIG. 1a, FIG. 1B is a schematic diagram of a line blanking area and a field blanking area.

As shown in FIG. 1B, a data transmit end may transmit video data 1 of the pixel line 101 of the image 10 in a time period 11 through a media interface. Therefore, the time period 11 is a line active area 1. After transmission of the video data 1 through the media interface is completed, the data transmit end enters a line blanking area 1, namely, a time period 12.

Similarly, the data transmit end may transmit video data 2 of a pixel line 102 of the image 10 in a time period 13 through the media interface. Therefore, the time period 13 is a line active area 2. After transmission of the video data 2 through the media interface is completed, the data transmit end enters a line blanking area 2, namely, a time period 14.

Similarly, the data transmit end may transmit video data 3 of a last pixel line (namely, a pixel line 103) of the image 10 in a time period 15 through the media interface. Therefore, the time period 15 is a line active area 3. After transmission of the video data 3 through the media interface is completed, the data transmit end enters the field blanking area, namely, a time period 16.

Figure 2:
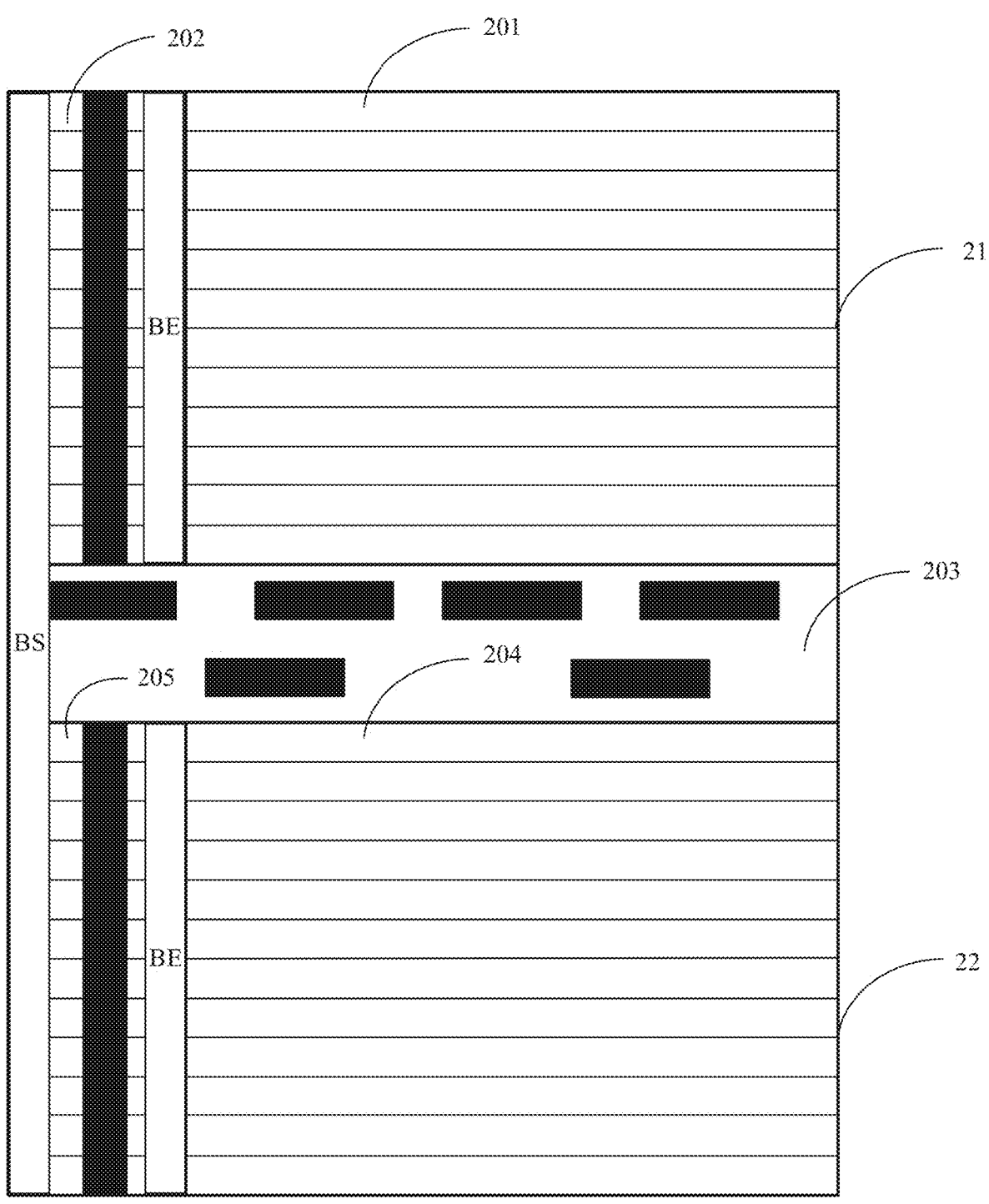
FIG. 2 is another schematic diagram of a line blanking area and a field blanking area according to an embodiment of this application.

To understand the line blanking area and the field blanking area more intuitively, refer to FIG. 2 below. FIG. 2 is another schematic diagram of a line blanking area and a field blanking area.

As shown in FIG. 2, an image 21 and an image 22 may respectively represent two continuous image frames of the to-be-transmitted video.

An area 201 may indicate a plurality of line active areas that are of a plurality of pieces of line video data of the image frame 21 and that are transmitted by the data transmit end through the media interface. An area 202 may indicate a plurality of line blanking areas after the data transmit end completes transmission of the plurality of pieces of line video data through the media interface.

An area 204 may indicate a plurality of line active areas that are of a plurality of pieces of line video data of the image frame 22 and that are transmitted by the data transmit end through the media interface. An area 205 may indicate a plurality of line blanking areas after the data transmit end completes transmission of the plurality of pieces of line video data through the media interface.

An area 203 may indicate a time period between transmission of the image frame 21 and transmission of the image frame 22 by the data transmit end through the media interface, namely, a field blanking area between transmission of the image frame 21 and transmission of the image frame 22.

(2) Other Terms

In embodiments of this application, words such as "example" or "for example" are for representing giving an example, an illustration, or a description. Any embodiment or design scheme described as an "example" or "for example" in embodiments of this application does not to be explained as being more preferred or having more advantages than another embodiment or design scheme. Exactly, use of the word such as "example" or "for example" is intended to present a relative concept in a specific manner.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more such features. In the descriptions of this application, unless otherwise stated, "a plurality of" means two or more than two.

In this application, the term "at least one" means one or more, and the term "a plurality of" means two or more. For example, a plurality of second packets mean two or more second packets. The terms "system" and "network" may be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

It should be understood that determining B based on A does not mean that B is determined only based on A, and B may alternatively be determined based on A and/or other information.

It should be further understood that when being used in this specification, the term "include" (also referred to as "includes", "including", "comprises", and/or "comprising") specifies presence of stated features, integers, steps, operations, elements, and/or components, but does not preclude presence or addition of one or more other features, integers, steps, operations, elements, components, and/or groups thereof.

It should be further understood that the term "if" may be interpreted as a meaning of "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that "one embodiment", "an embodiment", and "a possible implementation" mentioned in the entire specification mean that particular features, structures, or characteristics related to the embodiments or the implementations are included in at least one embodiment of this application. Therefore, "in one embodiment", "in an embodiment", or "in a possible implementation" appearing throughout this specification does not necessarily refer to a same embodiment. In addition, these particular features, structures, or characteristics may be combined in one or more embodiments in any appropriate manner.

Generally, for a video, source data of the video may include video data and auxiliary data. The video data is data of an image frame of the video. The auxiliary data is data other than the video data in the source data.

Usually, the auxiliary data may include at least one of different types of data such as audio data, audio rendering data, data related to rendering of an image frame of a video, remote control data, subtitle data, bullet comment data, special effect data, or logo data.

The audio data is used to play audio in the video. The audio rendering data is used to render the audio, to obtain rendering data of different audio effects. This is not limited.

The data related to rendering of the image frame of the video is used to render the image frame of the video to obtain different display effects, for example, adjusting brightness and/or contrast of the entire image frame of the video or adjusting brightness and/or contrast of a partial area of the image frame of the video. This is not limited.

The remote control data may be used to remotely operate a video image frame of the video. Therefore, the remote control data may include data for operating the video image frame of the video.

For example, when the video is a game video played on a mobile phone of a user, if the game video is projected on a television (television, TV) from the mobile phone of the user, the user may control a page of the game video displayed on the TV through a key on the mobile phone. In this scenario, data used to control the game page on the TV through the key on the mobile phone is the remote control data.

The subtitle data and the bullet comment data are used to display text on the image frame of the video. It should be understood that the subtitle data generally synchronizes with the video data and the audio data, and details are not described herein.

The special effect data is generally used to display different images on different image frames in the video. In this way, as the video is played, the different images can be displayed as a special effect animation.

The logo data is used to display a logo on the image frame of the video.

It should be understood that the foregoing description of the auxiliary data in the video is merely an example for description, and the description does not constitute a limitation on embodiments of this application.

To implement transmission of the video data and the auxiliary data of the to-be-transmitted video, the data transmit end may generally transmit the auxiliary data of the to-be-transmitted video in a blanking area generated when the video data of the to-be-transmitted video is transmitted through the media interface. In this way, the video data and the auxiliary data can be transmitted through a time-division multiplexing transmission link.

In other words, when the auxiliary data is transmitted by using the method, the data transmit end can start to transmit the auxiliary data of the to-be-transmitted video only after transmission of a piece of line video data is completed, that is, after entering the blanking area from an active area in which the video data is transmitted.

For example, before sending the video data of the to-be-transmitted video through the media interface, the data transmit end first sends a blanking-end (blanking-end, BE) identifier, and starts to send the video data of the to-be-transmitted video after sending the BE identifier. Then, after sending of a piece of line video data in the video data is completed, the data transmit end may send a blanking-start (blanking-start, BS) identifier. In this way, the data transmit end determines a time period (that is, the blanking area) between the BS identifier and a BE identifier to be sent next time as a packet sending window through which the auxiliary data is sent. Therefore, the data transmit end may send the auxiliary data of the to-be-transmitted video in the blanking area.

With reference to FIG. 2, as shown in FIG. 2, a blanking area after the BS identifier is sent and before the BE identifier is sent is a packet sending window of the auxiliary data, that is, the data transmit end sends the auxiliary data in the blanking area shown in FIG. 2. A black box shown in FIG. 2 indicates an auxiliary data packet. It can be learned that, in the active area (including the area 201 and the area 204) shown in FIG. 2, the data transmit end is not allowed to send the auxiliary data.

It can be learned from the foregoing description that, in different video playing formats, duration of the blanking area is specified differently. When the duration of the blanking area is short, if a data volume of the auxiliary data is large, the data transmit end cannot complete transmission of auxiliary data with a large data volume in a blanking area with a short duration. This may cause a problem of auxiliary data loss.

That the auxiliary data is the audio data is used as an example. If the audio data is audio data with a high sampling frequency, the data transmit end cannot complete transmission of the audio data with the high sampling frequency in the blanking area with the short duration. This may cause audio data loss. To prevent the audio data loss, high-quality audio cannot be provided for a user in this playing format. Therefore, this reduces user experience.

In addition, because the auxiliary data cannot be transmitted in the active area in which the video data is transmitted in the method, the auxiliary data is accumulated in a buffer of the data transmit end before the blanking area arrives. If the active area in which the video data is transmitted is long, the method requires the data transmit end to configure a large buffer to meet a buffer requirement. When the blanking area arrives, the data transmit end sends the auxiliary data accumulated in the buffer to a data receive end at a high sending frequency, and after the auxiliary data has been sent for a period of time, a frequency of sending the auxiliary data tends to be even. Therefore, the method further requires that the data receive end has performance of receiving and processing a large data volume in a short time.

In view of this, embodiments of this application provide a data transmission method, and transmission of the auxiliary data of the to-be-transmitted video by using the method no longer depends on the blanking area. That is, according to the method provided in embodiments of this application, the auxiliary data may be transmitted not only in the blanking area, but also in the active area. In other words, when the auxiliary data is transmitted by using the method, there is no need to wait for a dedicated packet sending window (namely, the blanking area). Therefore, according to the method provided in embodiments of this application, transmission of a large data volume of auxiliary data may be supported in a scenario of any video format, and user experience may be further improved.

In addition, the auxiliary data may be transmitted not only in the blanking area, but also in the line active area. Therefore, the auxiliary data does not need to be cached in the buffer of the data transmit end for a long time. In other words, according to the method provided in embodiments of this application, a requirement for a cache size of the data transmit end is reduced.

In addition, the auxiliary data may be transmitted at any moment including the blanking area. Therefore, according to the method provided in embodiments of this application, an effect of transmitting the auxiliary data to the data receive end at an even frequency can be implemented. In this way, a requirement for performance of the data receive end to receive and process data is reduced.

Embodiments of this application further provide a data transmission apparatus. The data transmission apparatus may be used as the data transmit end to perform the data transmission method provided in embodiments of this application. In other words, the data transmission apparatus is configured to send data to the data receive end.

The data transmission apparatus may be any terminal device that can obtain source data of the to-be-transmitted video. The terminal device may be a terminal device such as a set top box (set top box, STB), a mobile phone, a tablet, a notebook computer, a desktop computer, or a surveillance camera. This is not limited.

For example, the to-be-transmitted video may be a video shot by the terminal device by using a camera in advance, may be a video downloaded by the terminal device from a network (network), may be a video obtained by editing a picture in a local gallery by the terminal device by using video editing software, may be a video obtained by the terminal device from an external storage medium such as an optical disc, or the like. This is not limited in embodiments of this application.

For brief description, in embodiments of this application, the data transmission apparatus used as the data transmit end is referred to as a data sending apparatus below.

Figure 3:
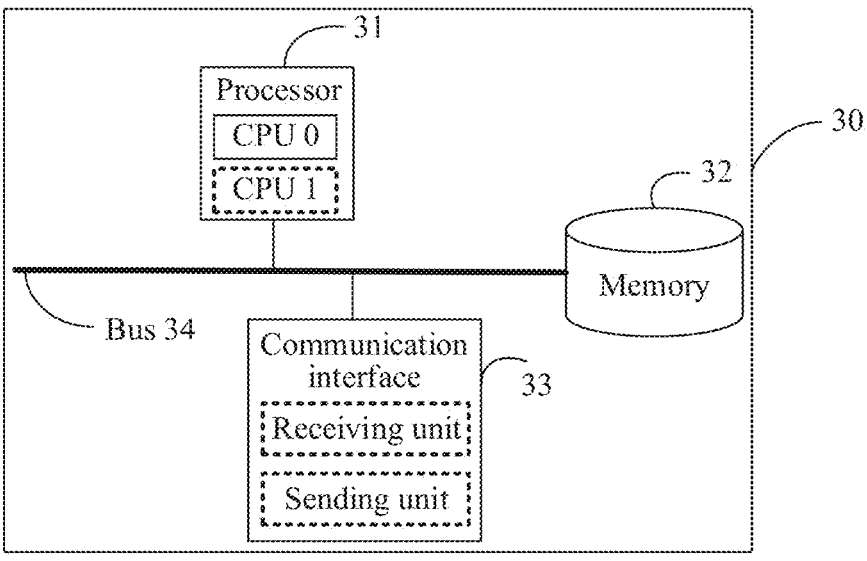
FIG. 3 is a schematic diagram of a hardware structure of a data sending apparatus according to an embodiment of this application.

FIG. 3 is a schematic diagram of a hardware structure of a data sending apparatus. As shown in FIG. 3, a data sending apparatus 30 includes a processor 31, a memory 32, a communication interface 33, and a bus 34. The processor 31, the memory 32, and the communication interface 33 may be connected through the bus 34.

The processor 31 is a control center of the data sending apparatus 30, and may be a general-purpose central processing unit (central processing unit, CPU), another general-purpose processor, or the like. The general-purpose processor may be a microprocessor, any conventional processor, or the like.

In an example, the processor 31 may include one or more CPUs, for example, a CPU 0 and a CPU 1 shown in FIG. 3.

The memory 32 may be a read-only memory (read-only memory, ROM) or another type of static storage device capable of storing static information and instructions, a random access memory (random access memory, RAM) or another type of dynamic storage device capable of storing information and instructions, or may be an electrically erasable programmable read-only memory (electrically erasable programmable read-only memory, EEPROM), a magnetic disk storage medium or another magnetic storage device, or any other medium capable of carrying or storing expected program code in a form of instructions or a data structure and capable of being accessed by a computer, but is not limited thereto.

In a possible implementation, the memory 32 may be independent of the processor 31. The memory 32 may be connected to the processor 31 through the bus 34, and is configured to store data, instructions, or program code. When invoking and executing the instructions or the program code stored in the memory 32, the processor 31 can implement the data transmission method provided in embodiments of this application.

In another possible implementation, the memory 32 may alternatively be integrated with the processor 31.

The communication interface 33 is used by the data sending apparatus 30 to connect to another device (such as a data receiving apparatus or a server) through communication. The data sending apparatus 30 and the data receiving apparatus may be connected and communicate with each other through a cable, wireless fidelity (wireless fidelity, Wi-Fi), Bluetooth (Bluetooth), or the like. The data sending apparatus 30 and the server may be connected and communicate with each other over an Ethernet, a radio access network (radio access network, RAN), a wireless local area network (wireless local area network, WLAN), or the like. The communication interface 33 may include a receiving unit configured to receive data and a sending unit configured to send the data.

The bus 34 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used in FIG. 3 for representation, but it does not indicate that there is only one bus or only one type of bus.

It should be noted that the structure shown in FIG. 3 does not constitute a limitation on the data sending apparatus 30. In addition to the components shown in FIG. 3, the data sending apparatus 30 may include more or fewer components than those shown in the figure, or combine some components, or have different component arrangements.

Embodiments of this application further provide another data transmission apparatus. The data transmission apparatus may be used as a data receive end to perform the data transmission method provided in embodiments of this application, in other words, is configured to receive data from a data transmit end.

The data transmission apparatus may be any terminal device that has a display function. Optionally, the data transmission apparatus may alternatively be any terminal device that has the display function and an audio play function. This is not limited.

For example, the terminal device may be a terminal device such as a TV, a mobile phone, a tablet, a notebook computer, a desktop computer, or a vehicle-mounted tablet.

For brief description, in embodiments of this application, the data transmission apparatus used as the data receive end is referred to as a data receiving apparatus below.

Figure 4:
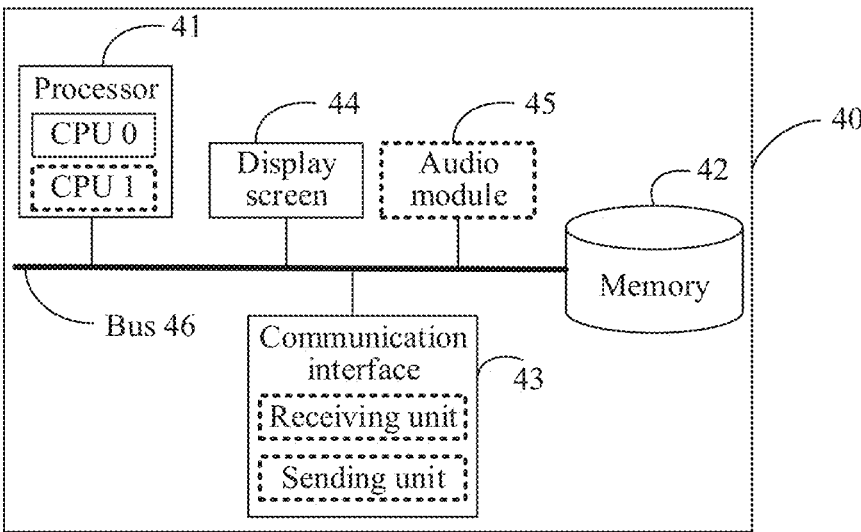
FIG. 4 is a schematic diagram of a hardware structure of a data receiving apparatus according to an embodiment of this application.

FIG. 4 is a schematic diagram of a hardware structure of a data receiving apparatus. As shown in FIG. 4, a data receiving apparatus 40 includes a processor 41, a memory 42, a communication interface 43, a display screen 44, and a bus 46. Optionally, the data receiving apparatus may further include an audio module 45. The processor 41, the memory 42, the communication interface 43, the display screen 44, and the audio module 45 may be connected through the bus 46.

The processor 41 is a control center of the data receiving apparatus 40, and may be a general-purpose central processing unit (central processing unit, CPU), another general-purpose processor, or the like. The general-purpose processor may be a microprocessor, any conventional processor, or the like.

In an example, the processor 41 may include one or more CPUs, for example, a CPU 0 and a CPU 1 shown in FIG. 4.

The memory 42 may be a read-only memory (read-only memory, ROM) or another type of static storage device capable of storing static information and instructions, a random access memory (random access memory, RAM) or another type of dynamic storage device capable of storing information and instructions, or may be an electrically erasable programmable read-only memory (electrically erasable programmable read-only memory, EEPROM), a magnetic disk storage medium or another magnetic storage device, or any other medium capable of carrying or storing expected program code in a form of instructions or a data structure and capable of being accessed by a computer, but is not limited thereto.

In a possible implementation, the memory 42 may be independent of the processor 41. The memory 42 may be connected to the processor 41 through the bus 46, and is configured to store data, instructions, or program code. When invoking and executing the instructions or the program code stored in the memory 42, the processor 41 can implement the data transmission method provided in embodiments of this application.

In another possible implementation, the memory 42 may alternatively be integrated with the processor 41.

The communication interface 43 is used by the data receiving apparatus 40 to connect to another device (such as a data sending apparatus) through communication. The data receiving apparatus 40 and the data sending apparatus may be connected and communicate with each other through a cable, Wi-Fi, Bluetooth, or the like. The communication interface 43 may include a receiving unit configured to receive data and a sending unit configured to send the data.

The display screen 44 is configured to display, based on the video data received by the data receiving apparatus 40, an image frame corresponding to the video data.

The display screen 44 may be a light-emitting diode (light-emitting diode, LED) display screen, a liquid crystal display (liquid crystal display, LCD) screen, or the like. This is not limited.

The audio module 45 is configured to convert audio data received by the data receiving apparatus 40 into an analog audio signal, and play a sound signal corresponding to the audio signal. For example, the audio module 45 plays music, audio in a video, and the like corresponding to the audio data received by the data receiving apparatus 40. This is not limited.

The audio module 45 may include at least one of a speaker, a speaker interface (for example, an interface connecting to a sound box), a headset jack, and the like. This is not limited.

The speaker may also be referred to as a "loudspeaker", and is configured to convert an audio electrical signal into a sound signal.

The speaker interface is configured to connect to an external speaker in a wired or wireless manner. The external speaker may be, for example, an external speaker device. This is not limited.

The headset jack is configured to connect to a wired headset, or connect to a wireless headset through Bluetooth. This is not limited. The headset jack may be a USB interface, or may be an open mobile electronic device platform (open mobile terminal platform, OMTP) standard interface, a cellular telecommunications industry association of the USA (cellular telecommunications industry association of the USA, CTIA) standard interface, or the like. This is not limited.

The bus 46 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used in FIG. 4 for representation, but it does not indicate that there is only one bus or only one type of bus.

It should be noted that the structure shown in FIG. 4 does not constitute a limitation on the data receiving apparatus 40. In addition to the components shown in FIG. 4, the data receiving apparatus 40 may include more or fewer components than those shown in the figure, or combine some components, or have different component arrangements.

Embodiments of this application further provide a data transmission system. The system may include the foregoing data sending apparatus and data receiving apparatus.

The data sending apparatus and the data receiving apparatus may be connected and communicate with each other in a wired or wireless manner. Herein, a wired communication manner may be connection and communication through a cable, and a wireless communication manner may be connection and communication in a wireless manner such as Bluetooth, Wi-Fi, infrared transmission. This is not specifically limited in embodiments of this application.

Figure 5:
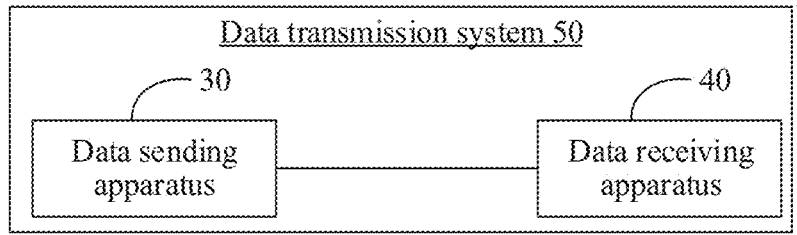
FIG. 5 is a schematic diagram of an architecture of a data transmission system according to an embodiment of this application.

FIG. 5 is a schematic diagram of an architecture of a data transmission system. As shown in FIG. 5, a data transmission system 50 includes a data sending apparatus 30 and a data receiving apparatus 40. In addition, the data sending apparatus 30 and the data receiving apparatus 40 are connected and communicate with each other in a wired or wireless manner.

The data sending apparatus 30 is configured to: obtain source data of a to-be-transmitted video, and send, by performing the data transmission method provided in embodiments of this application, the source data to the data receiving apparatus 40 by using a wired or wireless communication connection. In this way, after receiving the source data sent by the data sending apparatus 30 and processing the source data, the data receiving apparatus 40 may play a video corresponding to the source data.

Figure 6A:
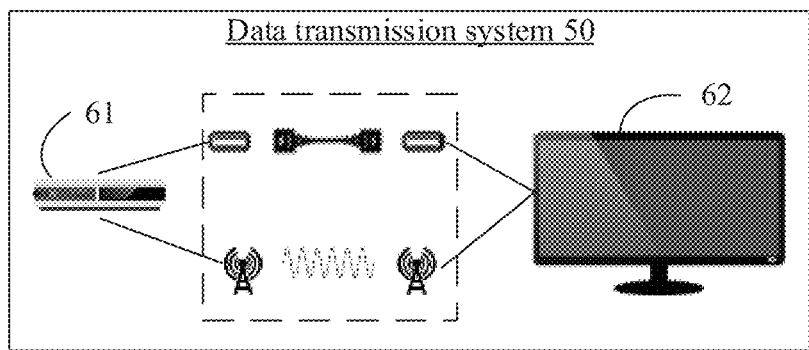
FIG. 6a is a schematic diagram of a data transmission system in an actual scenario according to an embodiment of this application.

For example, FIG. 6a is a schematic diagram of a data transmission system in an actual scenario.

As shown in FIG. 6a, a data transmission system 50 may include an STB 61 used as a data sending apparatus, and a TV 62 used as a data receiving apparatus. After downloading source data of a to-be-transmitted video from a server through a network, the STB 61 may send, by performing the data transmission method provided in embodiments of this application, the source data to the TV 62 in a wired or wireless communication manner. In this way, after receiving the source data sent by the STB 61 and processing the source data, the TV 62 may play a video corresponding to the source data.

It can be learned that, in this scenario, the STB 61 may transmit, by performing the method provided in embodiments of this application, the to-be-transmitted video to the TV 62. In this way, the TV 62 can play a received video.

Figure 6B:
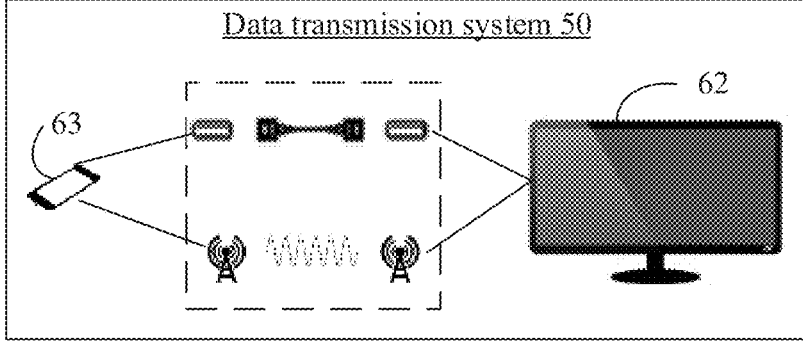
FIG. 6b is a schematic diagram of a data transmission system in another actual scenario according to an embodiment of this application.

For another example, FIG. 6b is a schematic diagram of a data transmission system in another actual scenario.

As shown in FIG. 6b, the data transmission system 50 may include a mobile phone 63 used as a data sending apparatus, and the TV 62 used as a data receiving apparatus. When the mobile phone 63 stores source data of a to-be-transmitted video that is shot in advance or downloaded from the network in advance, the mobile phone 63 may send, by performing the data transmission method provided in embodiments of this application, the source data to the TV 62 in the wired or wireless communication manner. In this way, after receiving the source data sent by the mobile phone 63 and processing the source data, the TV 62 may play a video corresponding to the source data.

It can be learned that, in this scenario, the mobile phone 63 projects, to the TV 62 by performing the method provided in embodiments of this application, a video stored in the mobile phone 63, and the TV 62 plays the video.

The following describes the method provided in embodiments of this application with reference to the accompanying drawings.

Figure 7:
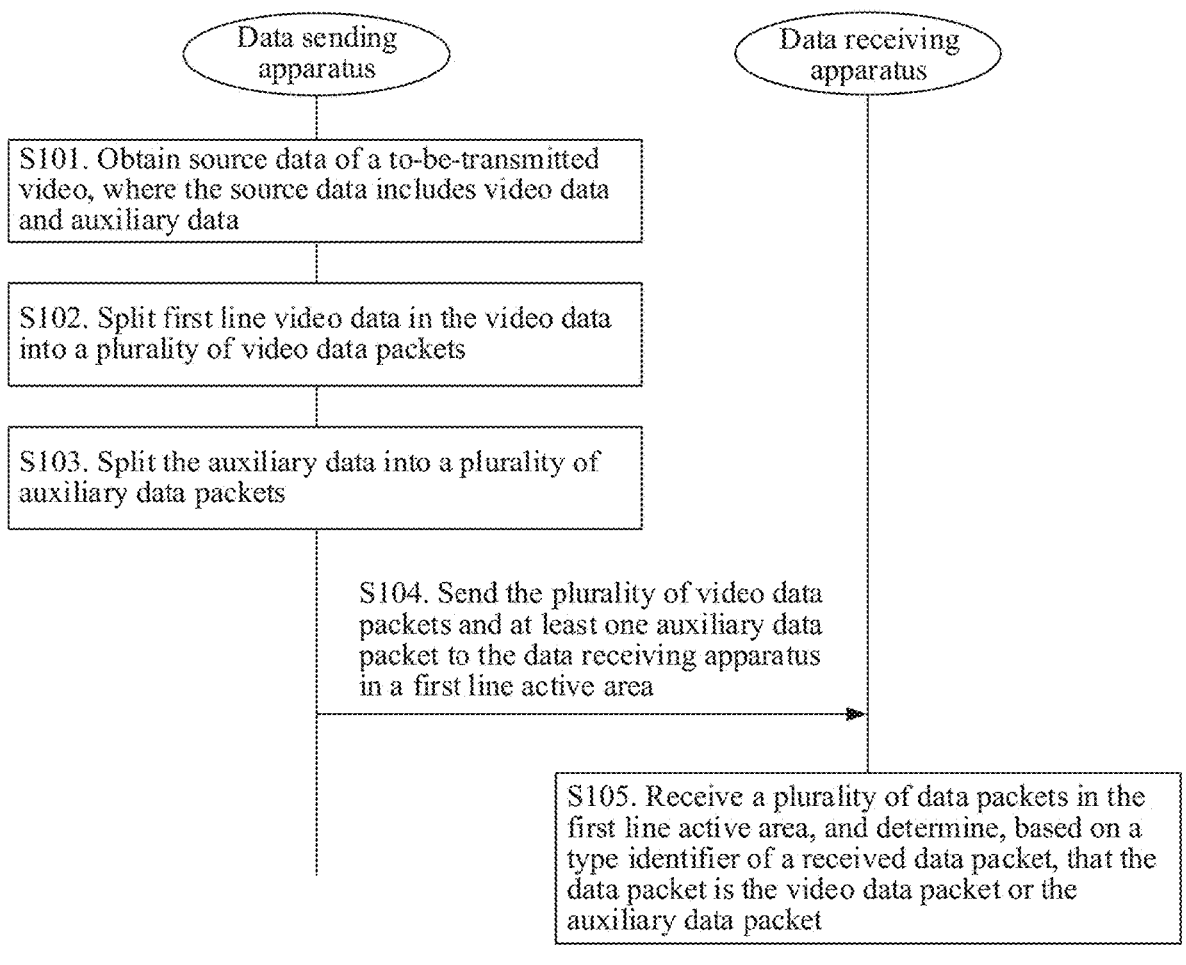
FIG. 7 is a schematic flowchart of a data transmission method according to an embodiment of this application.

FIG. 7 is a schematic flowchart of a data transmission method according to an embodiment of this application. The method may be applied to the data transmission system 50 shown in FIG. 5 or FIG. 6. The method may include the following steps.

S101. A data sending apparatus obtains source data of a to-be-transmitted video, where the source data includes video data and auxiliary data.

For descriptions of the to-be-transmitted video, the video data, and the auxiliary data, refer to the foregoing descriptions. Details are not described herein again.

Therefore, the data sending apparatus may obtain the to-be-transmitted video through shooting by using a camera in advance, to obtain the source data of the transmitted video.

Alternatively, the data sending apparatus may download the to-be-transmitted video from a network, to obtain the source data of the to-be-transmitted video.

Alternatively, the data sending apparatus may edit a picture in a local gallery in advance by using video editing software to obtain the to-be-transmitted video, to obtain the source data of the to-be-transmitted video.

Alternatively, the data sending apparatus may obtain the source data of the to-be-transmitted video from an external storage medium such as an optical disc, or the like. This is not limited in this embodiment of this application.

S102. The data sending apparatus splits first line video data in the video data into a plurality of video data packets.

The first line video data is any piece of line video data in the video data of the to-be-transmitted video. For descriptions of a piece of line video data herein, refer to the foregoing descriptions. Details are not described herein again.

Each of the plurality of video data packets includes a first type identifier, and the first type identifier indicates that a type of data in the video data packet is video data.

Optionally, the first type identifier may include an active video packet start (active video start, AVS) identifier and an active video packet end (active video end, AVE) identifier.

In a possible implementation, the data sending apparatus may split, based on a preset length, the first line video data into the plurality of video data packets that include the first type identifier. Herein, the preset length is less than a length of the first line video data.

Optionally, the data sending apparatus may first divide, based on the preset length, the first line video data into a plurality of data segments, insert an AVS before each data segment, and insert an AVE after each data segment. In this way, the data sending apparatus implements an objective of splitting the first line video data into the plurality of video data packets that include the first type identifier.

Figure 8A:
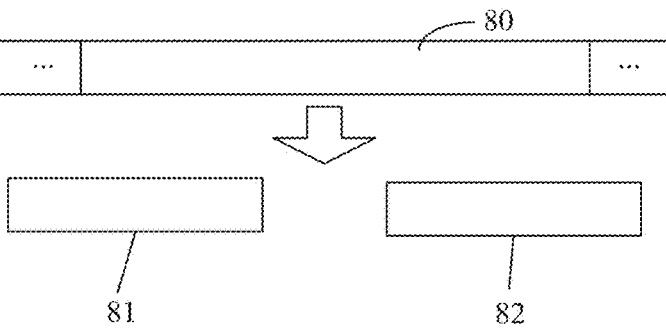
FIG. 8a is a schematic diagram of splitting video data according to an embodiment of this application.

For example, FIG. 8a is a schematic diagram of splitting video data.

As shown in FIG. 8a, video data 80 is any piece of line video data in the to-be-transmitted data. The data sending apparatus may split, based on a preset length, the video data 80 into two data segments, including a data segment 81 and a data segment 82.

Figure 8B:
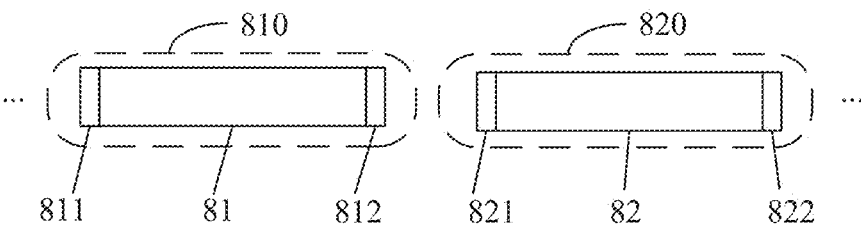
FIG. 8b is a schematic diagram of inserting a first type identifier into split video data according to an embodiment of this application.

FIG. 8*b* is a schematic diagram of inserting a first type identifier into split video data.

As shown in FIG. 8*b*, the data sending apparatus may insert an AVS 811 at a position of a character preceding a $1^{st}$ character of the data segment 81, and insert an AVE 812 at a position of a character following a last character of the data segment 81. In this way, a video data packet 810 can be obtained. Similarly, the data sending apparatus may insert an AVS 821 at a position of a character preceding a $1^{st}$ character of the data segment 82, and insert an AVE 822 at a position of a character following a last character of the data segment 82, to obtain a video data packet 820.

In another possible implementation, the data sending apparatus may split the first line video data into video data packets whose quantity is a preset quantity and that include the first type identifier. Herein, a value of the preset quantity is an integer greater than 1.

Optionally, that the preset quantity is m (m is an integer greater than 1) is used as an example. The data sending apparatus may first divide the first line video data into m data segments in an average or random manner. Then, the data sending apparatus may insert an AVS before each data segment, and insert an AVE after each data segment. In this way, the data sending apparatus implements an objective of splitting the first line video data into m video data packets.

Specifically, for any data segment in the m data segments, the data sending apparatus may insert an AVS at a position of a character preceding a $1^{st}$ character of the any data segment, and insert an AVE at a position of a character following a last character of the any data segment. In this way, a video data packet including the first type identifier and the any data segment is obtained.

It should be understood that, after obtaining a video data packet corresponding to video data, the data sending apparatus may cache the video data packet in a video data buffer to wait for sending.

S103. The data sending apparatus splits the auxiliary data into a plurality of auxiliary data packets.

Each of the plurality of auxiliary data packets includes a second type identifier, and the second type identifier indicates that a type of data in the auxiliary data packet is auxiliary data.

Optionally, the data sending apparatus may split, according to a preset rule, the auxiliary data into the plurality of auxiliary data packets that include the second type identifier. The preset rule is not specifically limited in this embodiment of this application.

For example, that the auxiliary data is audio data is used as an example. In this case, the preset rule may be encapsulating, into an audio data packet, audio data obtained through continuous sampling for a preset quantity of times. In other words, by using audio data collected when a quantity of times of continuous sampling is the preset quantity as a unit, the data sending apparatus may divide audio data of the to-be-transmitted video into a plurality of data segments. Then, the data sending apparatus inserts an auxiliary data start (auxiliary data start, ADS) identifier before each data segment, and inserts an auxiliary data end (auxiliary data end, ADE) identifier after each data segment. In this way, an objective of splitting the audio data of the to-be-transmitted video into a plurality of audio data packets is implemented.

It can be learned from the foregoing descriptions that the auxiliary data of the to-be-transmitted video may include only one type of auxiliary data. For example, the auxiliary data includes only audio data. Certainly, the auxiliary data of the to-be-transmitted video may alternatively include a plurality of different types of auxiliary data, for example, the audio data, subtitle data, and remote control data. This is not limited in this embodiment of this application.

In this case, if the auxiliary data of the to-be-transmitted video includes only one type of auxiliary data, the second type identifier may be represented by using the ADS and the ADE.

If the auxiliary data of the to-be-transmitted video includes a plurality of different types of auxiliary data, the second type identifier may be in a one-to-one correspondence with the plurality of different types of auxiliary data.

In a possible implementation, for any type of auxiliary data, the second type identifier may be represented by using a start identifier of the any type of auxiliary data and an end identifier of the any type of auxiliary data.

For example, for the audio data, the second type identifier may be represented by using an audio data start identifier and an audio data end identifier. For the subtitle data, the second type identifier may be represented by using a subtitle data start identifier and a subtitle data end identifier. For the remote control data, the second type identifier may be represented by using a remote control data start identifier and an end identifier of a remote control identifier. Details are not described.

In another possible implementation, the second type identifier may be represented by using the ADS, the ADE, and an auxiliary data type (type) identifier. Different values of the type identifier identify the different types of auxiliary data.

For example, when the auxiliary data includes the audio data, the subtitle data, and the remote control data, a type identifier whose value is 1 identifies the audio data, a type identifier whose value is 2 identifies the subtitle data, and a type identifier whose value is 3 identifies the remote control data, the second type identifier indicating that the type of data in the auxiliary data packet is the audio data may be represented by using the ADS, the ADE, and the type identifier whose value is 1, the second type identifier indicating that the type of data in the auxiliary data packet is the subtitle data may be represented by using the ADS, the ADE, and the type identifier whose value is 2, and the second type identifier indicating that the type of data in the auxiliary data packet is the remote control data may be represented by using the ADS, the ADE, and the type identifier whose value is 3.

Figure 9A:
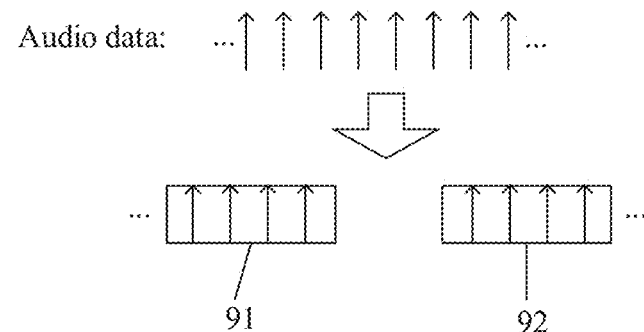
FIG. 9a is a schematic diagram of splitting audio data according to an embodiment of this application.

FIG. 9*a* is a schematic diagram of splitting audio data.

FIG. 9*a* shows a segment of audio data collected at a preset sampling frequency. If a value of a preset quantity of times is 4, the data sending apparatus may divide the audio data shown in FIG. 9*a* into two data segments, where the two data segments include a data segment 91 and a data segment 92. The data segment 91 and the data segment 92 each include audio data obtained by sampling for four continuous times.

Figure 9B:
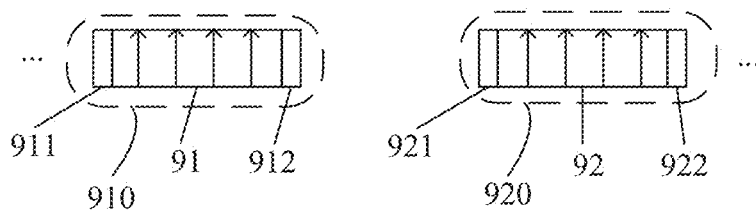
FIG. 9b is a schematic diagram of inserting a second type identifier into split audio data according to an embodiment of this application.

FIG. 9*b* is a schematic diagram of inserting a second type identifier into split audio data.

As shown in FIG. 9*b*, the data sending apparatus may insert an audio data start identifier 911 at a position of a character preceding a $1^{st}$ character of the data segment 91, and insert an audio data end identifier 912 at a position of a character following a last character of the data segment 91, to obtain an audio data packet 910. Similarly, the data sending apparatus may insert an audio data start identifier 921 at a position of a character preceding a $1^{st}$ character of the data segment 92, and insert an audio data end identifier 922 at a position of a character following a last character of the data segment 92, to obtain an audio data packet 920.

Figure 9C:
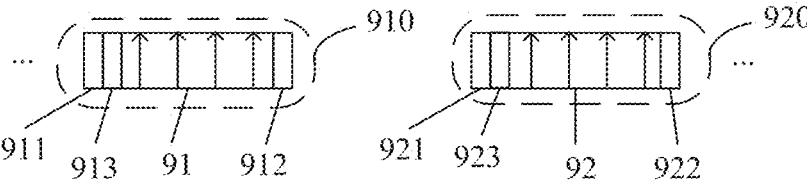
FIG. 9c is another schematic diagram of inserting a second type identifier into split audio data according to an embodiment of this application.

FIG. 9c is another schematic diagram of inserting a second type identifier into split audio data.

As shown in FIG. 9c, the data sending apparatus may alternatively insert an audio data start identifier 911 and a type identifier 913 at a position of a character preceding a $1^{st}$ character of the data segment 91, and insert an audio data end identifier 912 at a position of a character following a last character of the data segment 91, to obtain an audio data packet 910. Similarly, the data sending apparatus may insert an audio data start identifier 921 and a type identifier 923 at a position of a character preceding a $1^{st}$ character of the data segment 92, and insert an audio data end identifier 922 at a position of a character following a last character of the data segment 92, to obtain an audio data packet 920.

It should be understood that, if the auxiliary data of to-be-transmitted data includes a plurality of types of data, the data sending apparatus may obtain, based on the plurality of types of auxiliary data, different types of auxiliary data packets. For example, an audio data packet may be obtained based on audio data, a subtitle data packet may be obtained based on subtitle data, a remote control data packet may be obtained based on remote control data, and the like. Details are not described.

It should be understood that, after obtaining an auxiliary data packet corresponding to auxiliary data, the data sending apparatus may cache the auxiliary data packet in an auxiliary data buffer to wait for sending.

For example, the data sending apparatus may cache the audio data packet in an audio data buffer to wait for sending, cache the subtitle data packet in a subtitle data buffer to wait for sending, cache the remote control data packet in a remote control data buffer to wait for sending. Details are not described.

It may be understood that, in this embodiment of this application, a time sequence in which the data sending apparatus performs S102 and S103 is not specifically limited. For example, the data sending apparatus may perform S102 before performing S103, or may simultaneously perform S102 and S103. This is not limited.

S104. The data sending apparatus sends the plurality of video data packets and at least one auxiliary data packet to a data receiving apparatus in a first line active area.

The at least one auxiliary data packet is at least one auxiliary data packet in the plurality of auxiliary data packets.

Specifically, the data sending apparatus may transmit, according to a scheduling rule, the plurality of video data packets and the at least one auxiliary data packet in the first line active area.

The scheduling rule indicates a sending sequence of the plurality of video data packets and the at least one auxiliary data packet in the first line active area. It may be understood that the scheduling rule may be a scheduling rule preset by the data sending apparatus, or may be a scheduling rule obtained by the data sending apparatus in advance. This is not limited in this embodiment of this application.

Optionally, the scheduling rule may include a priority (strict priority, SP) scheduling rule or a round robin (round robin, RR) scheduling rule.

The SP scheduling rule indicates the data sending apparatus to sequentially send, based on priorities of the video data and the auxiliary data, data packets in the first line active area. Herein, the data sending apparatus first sends a data packet corresponding to high-priority data, and then sends a data packet corresponding to low-priority data.

For example, that the auxiliary data includes the audio data and the subtitle data is used as an example. A priority of the video data is higher than a priority of the audio data, and a priority of the audio data is higher than a priority of the subtitle data. In this case, the data sending apparatus preferentially sends, in the first line active area, a video data packet corresponding to the video data, when there is no unsent video data packet in a video data buffer, the data sending apparatus sends an audio data packet cached in an audio buffer, and when there is no unsent audio data packet in the audio buffer, the data sending apparatus sends a subtitle data packet cached in the subtitle data buffer.

The RR scheduling rule indicates the data sending apparatus to sequentially and cyclically send, in the first line active area, the video data packet and the auxiliary data packet in a preset sequence.

For example, that the auxiliary data packet includes the audio data packet and the subtitle data packet is used as an example, and the preset sequence is the video data packet→the audio data packet→the subtitle data packet. In this case, the data sending apparatus may sequentially send, based on the preset sequence, the video data packet→the audio data packet→the subtitle data packet in the first line active area, and cyclically perform this process until the first line active area ends or until all the plurality of video data packets obtained based on the first line video data are sent.

Further, the RR scheduling rule may be optimized as any one of scheduling rules such as a weighted round robin (weighted round robin, WRR) scheduling rule, a deficit round robin (deficit round robin, DRR) scheduling rule, and deficit weighted round robin (deficit weighted round robin, DWRR) scheduling rule by adding a round robin condition.

The following uses the WRR scheduling rule as an example for description. Based on the RR rule, the WRR scheduling rule increases a weight coefficient when polling each type of data packet. Specifically, the WRR scheduling rule may indicate the data sending apparatus to sequentially and cyclically send, based on the preset sequence and weight coefficients of different types of data packets, the video data packet and the auxiliary data packet in the first line active area.

For example, that the auxiliary data packet includes the audio data packet and the subtitle data packet is used as an example. When the preset sequence is the video data packet→the audio data packet→the subtitle data packet, a weight coefficient of the video data packet is 3, a weight coefficient of the audio data packet is 2, and a weight coefficient of the subtitle data packet is 1, the data sending apparatus may first send, based on the preset sequence, three video data packets, then send two audio data packets, and then send one subtitle data packet in the first line active area. Then the data sending apparatus cyclically performs this process until the first line active area ends or until all the plurality of video data packets obtained based on the first line video data are sent.

In addition, the data sending apparatus may alternatively send, based on a weighted fair queuing (weighted fair queuing, WFQ) scheduling rule, the plurality of video data packets and the at least one auxiliary data packet to the data receiving apparatus in the first line active area. Details are not described.

It should be understood that the plurality of scheduling rules described above are merely examples for description. A scheduling rule used in this embodiment of this application may be any scheduling rule described above, but this is not limited thereto.

It can be learned that the data sending apparatus can transmit, according to the scheduling rule, the auxiliary data in a line active area in which the video data is transmitted, without waiting for an arrival of a packet sending window (that is, a line blanking area or a field blanking area) before transmitting the auxiliary data. Therefore, the transmission of the auxiliary data no longer depends on a blanking area.

It should be further understood that, when a link bandwidth between the data sending apparatus and the data receiving apparatus is greater than a data transmission rate, the link bandwidth can be fully utilized by transmitting the auxiliary data packet in the line active area. The data transmission rate indicates a volume of video data that can be transmitted per unit time.

It should be further understood that, after sending of a plurality of video data packets corresponding to the first line video data is completed, the data sending apparatus sends a line blanking area start (horizontal blanking start, HBS) identifier to a video receiving apparatus, so that the data receiving apparatus determines, when receiving the HBS, that the sending of the plurality of video data packets corresponding to the first line video data is completed.

It should be further understood that, after sending of a plurality of video data packets corresponding to last line video data of any image frame is completed, the data sending apparatus sends a field blanking area start (vertical blanking start, VBS) identifier to the video receiving apparatus, so that the data receiving apparatus determines, when receiving the VBS, that sending of video data of an image frame is completed.

It should be further understood that, in a line blanking area before or after the first line active area, and/or in a field blanking area between two image frames of the to-be-transmitted video, the data sending apparatus may alternatively transmit the auxiliary data packet.

Figure 10:
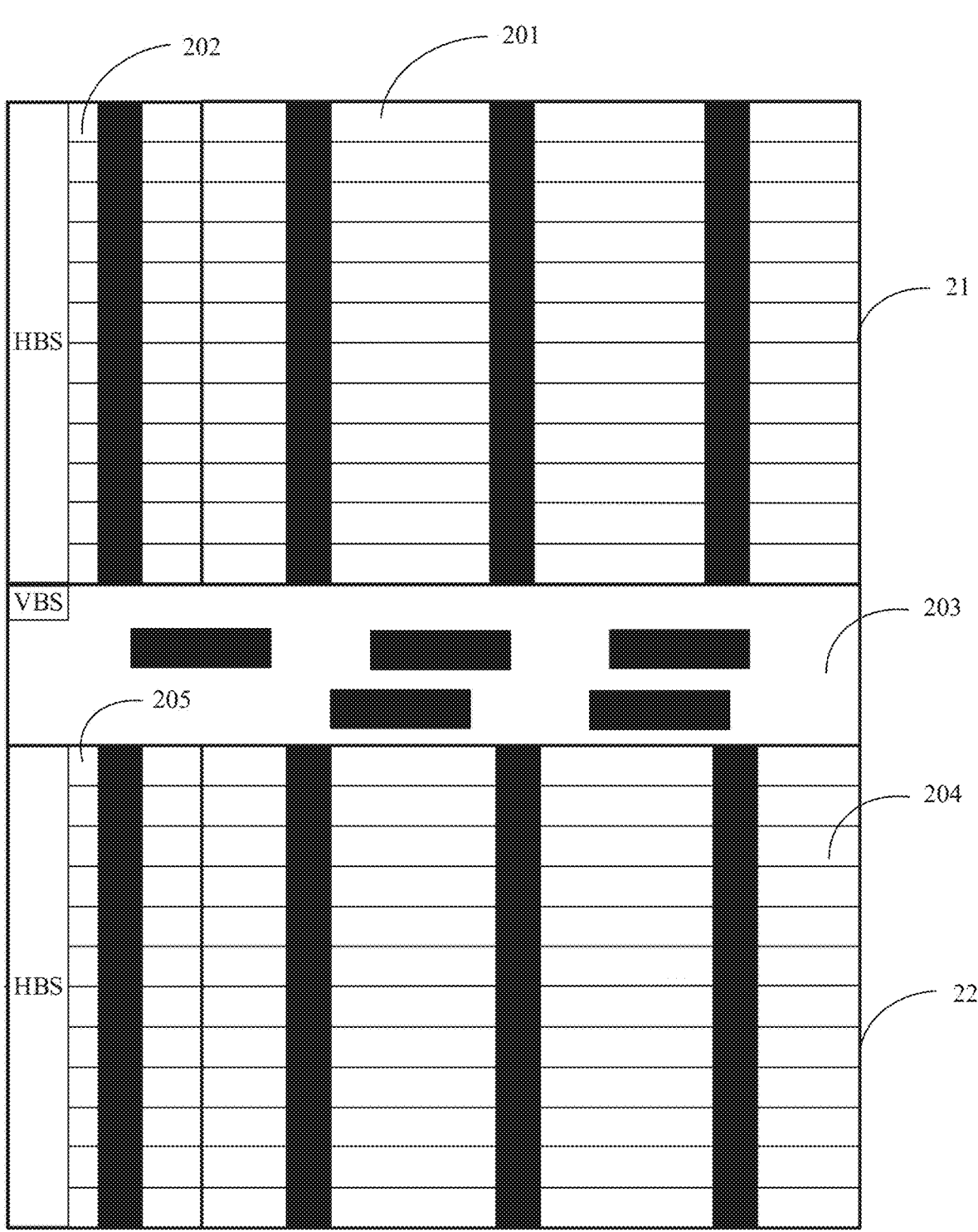
FIG. 10 is a schematic diagram of a time sequence of transmitting auxiliary data in a data transmission method according to an embodiment of this application.

With reference to FIG. 2, FIG. 10 is a schematic diagram of a time sequence of transmitting auxiliary data in a method according to an embodiment of this application.

As shown in FIG. 10, the data sending apparatus may send the auxiliary data packet in all of an area 201 and an area 204 that indicate a plurality of line active areas, an area 202 and an area 205 that indicate a plurality of line blanking areas, and an area 203 that indicates a field blanking area. A black box indicates the auxiliary data packet.

As shown in FIG. 10, after each line active area ends, that is, when the line blanking area starts, the data sending apparatus sends an BIBS identifier to the data receiving apparatus, and sends a VBS identifier to the data receiving apparatus after sending of last line video data of an image 21 is completed.

It is easily understood that, when the auxiliary data includes a plurality of types of auxiliary data, in the line blanking area before or after the first line active area, and/or in the field blanking area between two image frames of the to-be-transmitted video, the data sending apparatus may also transmit, according to the foregoing scheduling rule, a plurality of types of auxiliary data packets. Details are not described.

It should be further understood that, before sending a video data packet or the auxiliary data packet to the data receiving apparatus, the data sending apparatus further encodes the video data packet or the auxiliary data packet, to reduce a bit error rate when a data packet is transmitted on a link.

Further, optionally, if a link between the data sending apparatus and the data receiving apparatus has a structural requirement for a transmitted data flow, the data sending apparatus further encapsulates an encoded data packet, to meet the structural requirement of the link between the data sending apparatus and the data receiving apparatus for the transmitted data.

S105. The data receiving apparatus receives a plurality of data packets in the first line active area, and determines, based on a type identifier of a received data packet, that the data packet is the video data packet or the auxiliary data packet.

A plurality of data packets received by the data receiving apparatus from the data sending apparatus in the first line active area include the plurality of video data packets and the at least one auxiliary data packet.

For a first data packet in the plurality of data packets received by the data receiving apparatus, after receiving the first data packet, the data receiving apparatus may determine, based on a type identifier of the first data packet, that the first data packet is the video data packet or the auxiliary data packet. The first data packet is any data packet in the plurality of data packets received by the data receiving apparatus.

Specifically, if determining that the type identifier of the first data packet is a first type identifier, the data receiving apparatus may determine that the first data packet is the video data packet. In this way, the data receiving apparatus stores, in a video data cache area, data in the first data packet.

If determining that the type identifier of the first data packet is a second type identifier, the data receiving apparatus may determine that the first data packet is the auxiliary data packet. In this way, the data receiving apparatus stores, in an auxiliary data cache area, the data in the first data packet.

For example, if the second type identifier indicates that the auxiliary data is audio data, the data receiving apparatus determines that the first data packet is an audio data packet, and caches, in an audio data cache area, audio data in the first data packet. Similarly, if the second type identifier indicates that the auxiliary data is subtitle data, the data receiving apparatus determines that the first data packet is a subtitle data packet, and caches, in a subtitle data cache area, subtitle data in the first data packet.

It should be understood that the data receiving apparatus may further receive an HBS identifier sent by the data sending apparatus. In addition, the data receiving apparatus may determine, as a plurality of video data packets corresponding to a piece of line video data, a plurality of video data packets that are received in a time period between two continuous receptions of the HBS identifier. In other words, video data in the plurality of video data packets corresponds to a line pixel of an image frame.

It should be further understood that the data receiving apparatus may further receive a VBS identifier sent by the data sending apparatus. In addition, the data receiving apparatus may determine, as a plurality of video data packets corresponding to data of one image frame, a plurality of video data packets that are received in a time period between two continuous receptions of the VBS identifier. In other words, video data in the plurality of video data packets corresponds to one image frame.

In this way, the data receiving apparatus may display and play, by using a display screen of the data receiving apparatus, video data cached in the video data cache area. In addition, the data receiving apparatus may play, by using the display screen or an audio module of the data receiving apparatus, auxiliary data cached in the auxiliary data cache area.

For example, the data receiving apparatus plays, by using the audio module of the data receiving apparatus, audio data cached in the audio data cache area. Alternatively, the data receiving apparatus displays and plays, by using the display screen of the data receiving apparatus, subtitle data cached in the subtitle data cache area. Details are not described.

It should be understood that, if the data sending apparatus encodes and encapsulates a data packet before sending the data packet, the plurality of data packets received by the data receiving apparatus described above are data packets that are obtained by the data receiving apparatus through decapsulation and decoding on a data flow received from the data sending apparatus.

So far, according to the data transmission method provided in this embodiment of this application, the auxiliary data may be transmitted in a line active area in which the video data is transmitted. In this way, transmission of the auxiliary data no longer depends on the blanking area. Therefore, according to the method provided in this embodiment of this application, transmission of a large data volume of the auxiliary data may be supported in any video format scenario, and user experience may be further improved.

In addition, the auxiliary data may be transmitted not only in the blanking area, but also in the line active area. Therefore, the auxiliary data is usually not cached in a buffer of a data transmit end for a long time. In other words, according to the method provided in this embodiment of this application, a requirement for a cache size of the data sending apparatus is reduced.

In addition, the auxiliary data may be transmitted at any moment including the blanking area. Therefore, according to the method provided in this embodiment of this application, an auxiliary packet can be transmitted to the data receiving apparatus at an even sending frequency. In this way, a requirement for performance of the data receiving apparatus to receive and process data is reduced.

Figure 11:
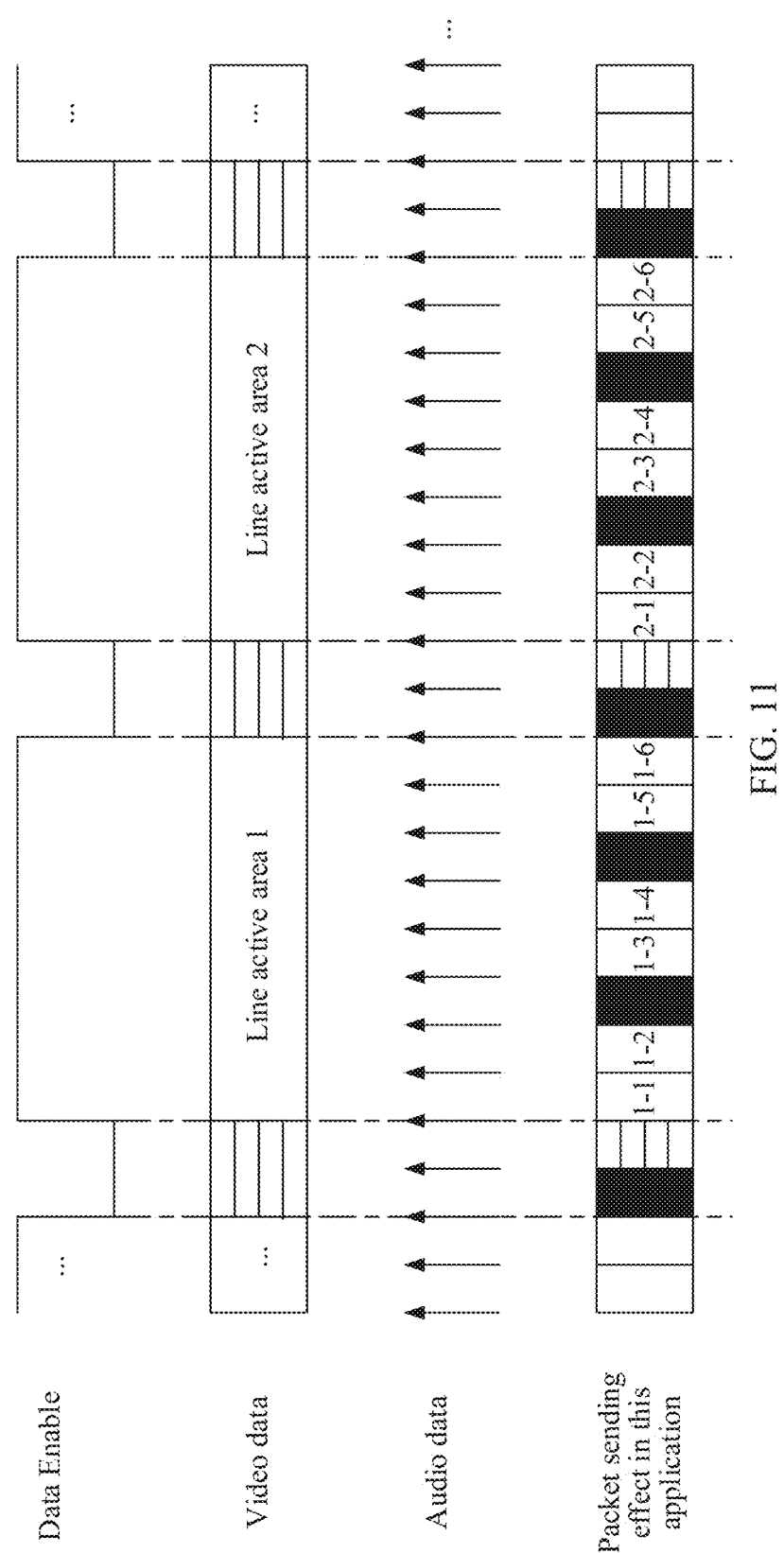
FIG. 11 is a schematic diagram of a beneficial effect of a data transmission method according to an embodiment of this application.

To further understand beneficial effects brought by the method provided in embodiments of this application, the following describes the beneficial effects brought by the method provided in embodiments of this application with reference to FIG. 11 by using an example in which the auxiliary data includes only audio data.

FIG. 11 is a schematic diagram of a beneficial effect of a data transmission method according to an embodiment of this application.

As shown in FIG. 11, a line "Data Enable" schematically shows, by using square waves, a time sequence relationship between a line active area and a blanking area for transmitting video data by a data sending apparatus. Usually, when a value of Data Enable is 1, it indicates a line active area when the data sending apparatus transmits a to-be-transmitted video, and when the value of Data Enable is 0, it indicates a blanking area when the data sending apparatus transmits the to-be-transmitted video.

As shown in FIG. 11, for example, a line "Video data" shows the time sequence relationship between the line active area and the blanking area for transmitting the video data by the data sending apparatus. A white box indicates the line active area for transmitting the video data, and a striped box indicates a blanking area in which the video data cannot be transmitted. The blanking area may be a line blanking area or a field blanking area.

As shown in FIG. 11, a line "Audio data" shows collected audio data.

In this way, the data sending apparatus may split line video data of the to-be-transmitted video into a plurality of video data packets and split the audio data into a plurality of audio data packets by performing the foregoing S102 and S103.

For example, the data sending apparatus splits line video data corresponding to a line active area 1 into a video data packet 1-1, a video data packet 1-2, a video data packets 1-3, a video data packet 1-4, a video data packet 1-5, and a video data packet 1-6. In addition, the data sending apparatus splits line video data corresponding to a line active area 2 into a video data packet 2-1, a video data packet 2-2, a video data packet 2-3, a video data packet 2-4, a video data packet 2-5, and a video data packet 2-6.

In this way, by performing the foregoing S104, the data sending apparatus can implement a packet sending time sequence effect shown in a line "Packet sending effect in this application" shown in FIG. 11. In other words, in the line active area, the data sending apparatus may cyclically perform, according to a scheduling rule, a process of sending two video data packets and then sending one audio data packet.

In addition, it can be further learned from FIG. 11 that, in the blanking area, the data sending apparatus may also send the audio data packet. As shown in FIG. 11, when the data sending apparatus transmits the audio data in the blanking area, if there is no to-be-sent audio data packet in an audio data buffer before the blanking area ends, the data sending apparatus sends a data padding packet to a data receiving apparatus, that is, a data packet shown by a striped box in the line "Packet sending effect in this application" in FIG. 11. Through this operation, the data sending apparatus can be enabled to send data based on a requirement for a link bandwidth between the data sending apparatus and the data receiving apparatus, so that the data receiving apparatus can accurately receive a data packet.

It can be learned that, when transmitting the audio data, the data sending apparatus no longer depends on the blanking area. Therefore, when the data sending apparatus transmits video data of any video format, because the audio data no longer depends on the blanking area, the data sending apparatus may transmit audio data with a high sampling frequency, so that a video format no longer limits audio quality, and user experience is further improved.

In addition, it can be learned from FIG. 11 that, according to the data transmission method provided in embodiments of this application, the data sending apparatus can send an auxiliary data packet at an even sending frequency, and further, the data sending apparatus does not accumulate a large quantity of to-be-sent auxiliary data packets in a buffer. Therefore, according to the method provided in embodiments of this application, a requirement for a cache of a data transmit end is reduced, and a requirement for performance of a data receive end to receive and process data is reduced.

The foregoing mainly describes the solutions provided in embodiments of this application from the perspective of the methods. To implement the foregoing functions, corresponding hardware structures and/or software modules for performing the functions are included. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the data transmission apparatus may be divided into function modules based on the foregoing method examples. For example, each function module may be obtained through division based on a corresponding function, or two or more functions may be integrated into one processing module. The foregoing integrated module may be implemented in a form of hardware, or may be implemented in a form of a software function module. It should be noted that, in embodiments of this application, module division is an example, and is merely a logical function division. In actual implementation, another division manner may be used.

Figure 12:
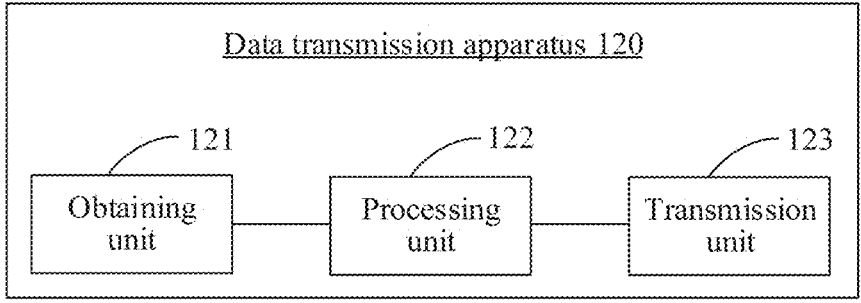
FIG. 12 is a schematic diagram of a structure of a data transmission apparatus according to an embodiment of this application.

FIG. 12 is a schematic diagram of a structure of a data transmission apparatus 120 according to an embodiment of this application. The data transmission apparatus 120 may be used as a data transmit end to perform the foregoing data transmission method, for example, configured to perform the method shown in FIG. 7. The data transmission apparatus 120 may include an obtaining unit 121, a processing unit 122, and a transmission unit 123.

The obtaining unit 121 is configured to obtain video data of a to-be-transmitted video, where the video data is data of an image frame of the to-be-transmitted video. The processing unit 122 is configured to split first line video data in the video data into a plurality of video data packets, where the first line video data is any piece of line video data in the video data. The transmission unit 123 is configured to transmit the plurality of video data packets and at least one auxiliary data packet in a first line active area. The first line active area is a line active area corresponding to the first line video data, and the auxiliary data packet includes data other than the video data of the to-be-transmitted video.

For example, with reference to FIG. 7, the obtaining unit 121 may be configured to perform S101, the processing unit 122 may be configured to perform S102, and the transmission unit 123 may be configured to perform S104.

Optionally, the auxiliary data packet is obtained based on auxiliary data. The auxiliary data includes at least one of audio data, audio rendering data, data related to rendering of the image frame of the to-be-transmitted video, remote control data, subtitle data, bullet comment data, special effect data, or logo data. The remote control data is used to remotely operate an image frame.

Optionally, the transmission unit 123 is specifically configured to transmit, according to a scheduling rule, the plurality of video data packets and the at least one auxiliary data packet in the first line active area. The scheduling rule indicates a sending sequence of the plurality of video data packets and the at least one auxiliary data packet.

For example, with reference to FIG. 7, the transmission unit 123 may be configured to perform S104.

Optionally, the foregoing scheduling rule includes a priority scheduling rule or a round robin scheduling rule.

Optionally, the video data packet includes a first type identifier indicating that a type of data in the video data packet is video data.

Optionally, the foregoing auxiliary data packet includes a second type identifier indicating that a type of data in the auxiliary data packet is auxiliary data.

Optionally, the transmission unit 123 is further configured to: transmit the auxiliary data packet in a line blanking area before or after the first line active area; and/or transmit the auxiliary data packet in a field blanking area between two image frames of the to-be-transmitted video.

For specific descriptions of the foregoing optional manners, refer to the foregoing method embodiments. Details are not described herein again. In addition, for descriptions of any explanation and beneficial effect of the data transmission apparatus 120 provided above, refer to the foregoing corresponding method embodiments, and details are not described herein again.

For example, with reference to FIG. 3, a function implemented by the obtaining unit 121 in the data transmission apparatus 120 may be implemented by the processor 31 in FIG. 3 by executing the program code in the memory 32 in FIG. 3, or by using the communication interface 33 in FIG. 3. A function implemented by the processing unit 122 may be implemented by the processor 31 in FIG. 3 by executing the program code in the memory 32 in FIG. 3. A function implemented by the transmission unit 123 may be implemented by using the communication interface 33 in FIG. 3.

Figure 13:
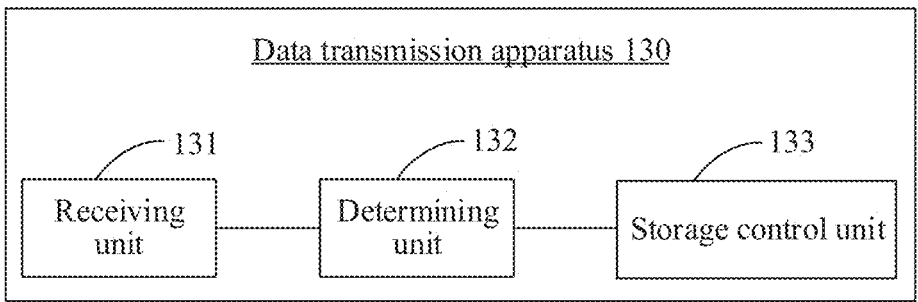
FIG. 13 is a schematic diagram of a structure of another data transmission apparatus according to an embodiment of this application.

FIG. 13 is a schematic diagram of a structure of a data transmission apparatus 130 according to an embodiment of this application. The data transmission apparatus 130 may be used as a data receive end to perform the foregoing data transmission method, for example, configured to perform the method shown in FIG. 7. The data transmission apparatus 130 may include a receiving unit 131 and a determining unit 132.

The receiving unit 131 is configured to receive a plurality of data packets in a first line active area. The determining unit 132 is configured to determine, based on a type identifier of a first data packet, whether the first data packet is a video data packet or an auxiliary data packet. The plurality of data packets include a plurality of video data packets and at least one auxiliary data packet. The plurality of video data packets are obtained by splitting first line video data, the first line video data is any piece of line video data in video data of a to-be-received video, the video data is data of an image frame of the to-be-received video, the first line active area is a line active area corresponding to the first line video data, the auxiliary data packet includes data other than the video data in the to-be-received video, and the first data packet is any data packet in the plurality of data packets.

For example, with reference to FIG. 7, the receiving unit 131 and the determining unit 132 may be configured to perform S105.

Optionally, the determining unit 132 is specifically configured to: if the type identifier is a first type identifier, determine that the first data packet is the video data packet. The first type identifier indicates that a type of data in the data packet is video data. The determining unit 132 is further specifically configured to: if the type identifier is a second type identifier, determine that the first data packet is an auxiliary data packet. The second type identifier indicates that a type of data in the data packet is auxiliary data.

For example, with reference to FIG. 7, the determining unit 132 may be configured to perform S105.

Optionally, the data transmission apparatus 130 further includes a storage control unit 133, configured to store the plurality of video data packets in a video data cache space, and store the at least one auxiliary data packet in an auxiliary data cache space.

For specific descriptions of the foregoing optional manners, refer to the foregoing method embodiments. Details are not described herein again. In addition, for descriptions of any explanation and beneficial effect of the data transmission apparatus 130 provided above, refer to the foregoing corresponding method embodiments, and details are not described herein again.

For example, with reference to FIG. 4, a function implemented by the receiving unit 131 in the data transmission apparatus 130 may be implemented by using the communication interface 43 in FIG. 4. Functions implemented by the determining unit 132 and the storage control unit 133 may be implemented by the processor 41 in FIG. 4 by executing the program code in the memory 42 in FIG. 4.

Figure 14A:
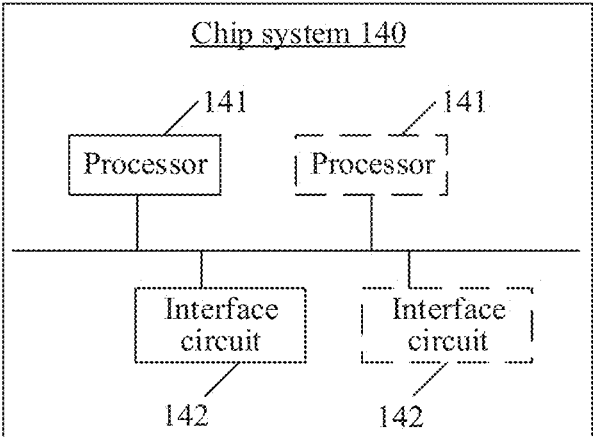
FIG. 14a is a schematic diagram of a structure of a chip system according to an embodiment of this application.

Embodiments of this application further provide a chip system 140. As shown in FIG. 14*a*, the chip system 140 includes at least one processor and at least one interface circuit. For example, when the chip system 140 includes one processor and one interface circuit, the processor may be a processor 141 (or a processor 141 shown in a dashed-line box) shown in a solid-line box in FIG. 14*a*. The interface circuit may be an interface circuit 142 (or an interface circuit 142 shown in a dashed-line box) shown in a solid-line box in FIG. 14*a*. When the chip system 140 includes two processors and two interface circuits, the two processors include the processor 141 shown in the solid-line box and the processor 141 shown in the dashed-line box in FIG. 14*a*. The two interface circuits include the interface circuit 142 shown in the solid-line box and the interface circuit 142 shown in the dashed-line box in FIG. 14*a*. This is not limited.

The processor 141 and the interface circuit 142 may be interconnected through a line. For example, the interface circuit 142 may be configured to receive a signal (for example, obtain source data of a to-be-transmitted video). For another example, the interface circuit 142 may be configured to send the signal to another apparatus (for example, the processor 141). For example, the interface circuit 142 may read instructions stored in a memory, and send the instructions to the processor 141. When the instructions are executed by the processor 141, the data transmission apparatus may be enabled to perform the steps in the foregoing embodiments. Certainly, the chip system 140 may further include another discrete component. This is not specifically limited in embodiments of this application.

Figure 14B:
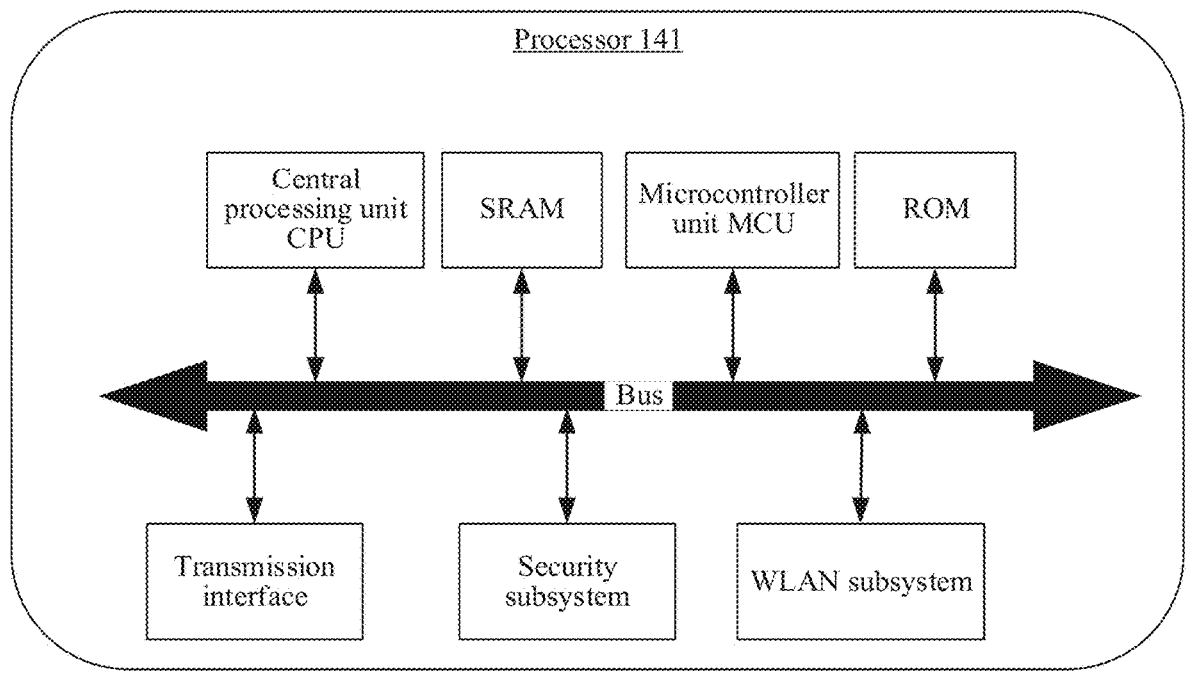
FIG. 14b is a diagram of a hardware architecture of a processor according to an embodiment of this application.

FIG. 14*b* is a diagram of a hardware architecture of a processor 141.

As shown in FIG. 14*b*, the processor 141 includes at least one CPU and a memory. A type of the memory may include, for example, an SRAM, a ROM, a microcontroller unit (Microcontroller Unit, MCU), a security subsystem, a WLAN subsystem, a bus, a transmission interface, and the like. Although not shown in FIG. 14*a*, the chip system 140 may further include another dedicated processor such as an application processor (Application Processor, AP), an NPU, and another subsystem such as a power management subsystem, a clock management subsystem, and a power consumption management subsystem.

The foregoing parts of the chip system 140 are coupled by using a connector. For example, the connector includes various types of interfaces, transmission lines, buses, or the like. These interfaces are usually electrical communication interfaces, but may alternatively be mechanical interfaces or interfaces in other forms. This is not limited in this embodiment.

Optionally, the CPU may be a single-core (single-CPU) processor or a multi-core (multi-CPU) processor. Optionally, the CPU may be a processor group including a plurality of processors, and the plurality of processors are coupled to each other through one or more buses. In an optional case, the CPU invokes program instructions stored in an on-chip memory or an off-chip memory to implement any wireless projection method in the foregoing method embodiments. In an optional case, the CPU and the MCU jointly implement any wireless projection method in the foregoing method embodiments. For example, the CPU completes some steps in the wireless projection method, and the MCU completes other steps in the wireless projection method. In an optional case, the AP or the another dedicated processor invokes the program instructions stored in the on-chip memory or the off-chip memory to implement any wireless projection method in the foregoing method embodiments.

The transmission interface may be an interface of a processor chip for receiving and sending data. The transmission interface usually includes a plurality of interfaces. In an optional case, the transmission interface may include an inter-integrated circuit (Inter-Integrated Circuit, I2C) interface, a serial peripheral interface (Serial Peripheral Interface, SPI), a universal asynchronous receiver-transmitter (Universal asynchronous receiver-transmitter, UART) interface, a general-purpose input/output (General-purpose input/output, GPIO) interface, and the like. It should be understood that these interfaces may implement different functions by multiplexing a same physical interface.

In an optional case, the transmission interface may further include a high definition multimedia interface (High Definition Multimedia Interface, HDMI), a V-By-One interface, an embedded display port (Embedded Display Port, eDP), a mobile industry processor interface (Mobile Industry Processor Interface, MIPI), a display port (DP), or the like.

In an optional case, the foregoing parts are integrated on a same chip. In another optional case, the memory may be a chip that is exists independently.

The security subsystem may be used to implement an encryption algorithm related to security authentication. It should be understood that the encryption algorithm related to security authentication is usually implemented by hardware, so that security of the encryption algorithm can be further improved.

The WLAN subsystem may include, for example, an RF circuit and a baseband.

Another embodiment of this application further provides a computer-readable storage medium. The computer-readable storage medium stores instructions. When the instructions are run on a data transmission apparatus, the data transmission apparatus performs steps performed by the data transmission apparatus in the method process shown in the foregoing method embodiment.

In some embodiments, the disclosed methods may be implemented as computer program instructions encoded in a machine-readable format on a computer-readable storage medium or encoded on another non-transitory medium or product.

Figure 15:
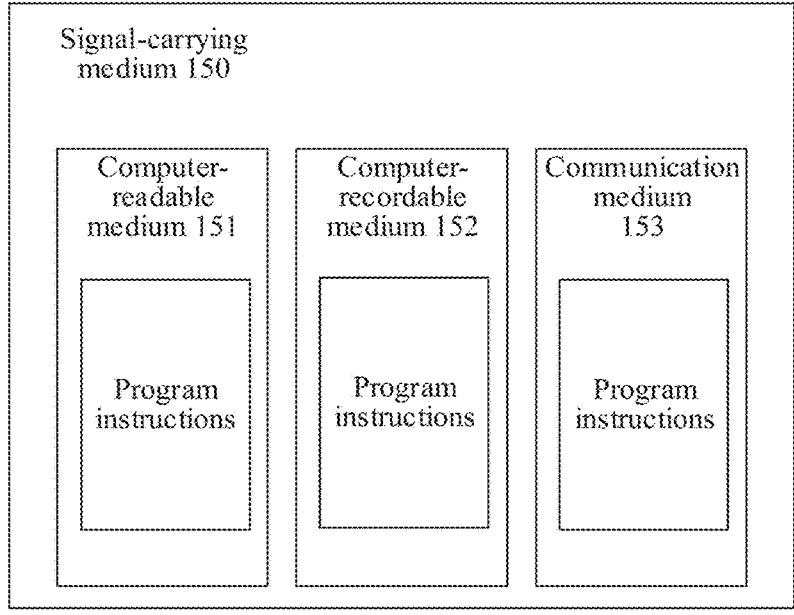
FIG. 15 is a schematic diagram of a structure of a signal-carrying medium configured to carry a computer program product according to an embodiment of this application.

FIG. 15 is a schematic diagram of a structure of a signal-carrying medium configured to carry a computer program product according to an embodiment of this application. The signal-carrying medium is configured to store the computer program product or is configured to store a computer program that executes a computer process on a computing device.

As shown in FIG. 15, a signal-carrying medium 150 may include one or more program instructions, and when the one or more program instructions are run by one or more processors, the functions or some of the functions described in FIG. 7 may be provided. Therefore, for example, one or more features described with reference to S101 to S105 in FIG. 7 may be borne by one or more instructions associated with the signal-carrying medium 150. In addition, the program instructions in FIG. 15 are also described as example instructions.

In some examples, the signal-carrying medium 150 may include a computer-readable medium 151, for example, but not limited to, a hard disk drive, a compact disc (CD), a digital video disc (DVD), a digital tape, a memory, a read-only memory (read-only memory, ROM), or a random access memory (random access memory, RAM).

In some implementations, the signal-carrying medium 150 may include a computer-recordable medium 152, for example, but not limited to, a memory, a read/write (R/W) CD, or an R/W DVD.

In some implementations, the signal-carrying medium 150 may include a communication medium 153, for example, but is not limited to a digital and/or analog communication medium (for example, an optical fiber cable, a waveguide, a wired communication link, or a wireless communication link).

The signal-carrying medium 150 may be conveyed by a wireless-form communication medium 153 (for example, a wireless communication medium that complies with the IEEE 1902.11 standard or another transport protocol). The one or more program instructions may be, for example, computer-executable instructions or logic implementation instructions.

In some examples, the data transmission apparatus described with respect to FIG. 7 may be configured to provide various operations, functions, or actions in response to one or more program instructions in the computer-readable medium 151, the computer-recordable medium 152, and/or the communication medium 153.

It should be understood that, the arrangement described herein is used as an example only. Therefore, a person skilled in the art will understand that other arrangements and other elements (for example, machines, interfaces, functions, sequences, and function groups) can be used instead, and some elements may be omitted together based on a desired result. In addition, many of the described elements are functional entities that can be implemented as discrete or distributed components, or implemented in any suitable combination at any suitable position in combination with another component.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer-executable instructions are executed on a computer, the procedures or functions according to embodiments of this application are all or partially generated. The computer may be a general-purpose computer, a special-purpose computer, a computer network, or other programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, wherein the method comprises:
    obtaining video data of a to-be-transmitted video, wherein the video data is data of an image frame of the to-be-transmitted video;
    splitting first line video data in the video data into a plurality of video data packets, wherein the first line video data is a piece of line video data in the video data; and
    transmitting the plurality of video data packets and at least one auxiliary data packet in a first line active area, wherein the first line active area is a line active area corresponding to the first line video data, and the auxiliary data packet comprises data other than the video data of the to-be-transmitted video, wherein each of the plurality of video data packets comprises a first type identifier, and the first type identifier indicates that a type of data in the respective video data packet is video data, wherein the auxiliary data packet comprises a second type identifier, and the second type identifier indicates that a type of data in the auxiliary data packet is auxiliary data.

2. The method according to claim 1, wherein the auxiliary data packet is obtained based on auxiliary data, and the auxiliary data comprises at least one of audio data, audio rendering data, data related to rendering of the image frame of the to-be-transmitted video, remote control data, subtitle data, bullet comment data, special effect data, or logo data, wherein the remote control data is used to remotely operate the image frame.

3. The method according to claim 1, wherein the transmitting the plurality of video data packets and at least one auxiliary data packet in a first line active area comprises:
    transmitting, according to a scheduling rule, the plurality of video data packets and the at least one auxiliary data packet in the first line active area, wherein the scheduling rule indicates a sending sequence of the plurality of video data packets and the at least one auxiliary data packet.

4. The method according to claim 1, wherein the method further comprises:
    transmitting the auxiliary data packet in a line blanking area before or after the first line active area; or
    transmitting the auxiliary data packet in a field blanking area between two image frames of the to-be-transmitted video.

5. The method according to claim 1, wherein the first type identifier includes an active video packet start (AVS) identifier and an active video packet end (AVE) identifier.

6. The method according to claim 1, wherein the second type identifier is represented by an auxiliary data start (ADS) identifier and an auxiliary data end (ADE) identifier.

7. The method according to claim 1, wherein the second type identifier is represented by an ADS identifier, an ADE identifier, and an auxiliary data type identifier.

8. The method according to claim 3, wherein the scheduling rule comprises a priority scheduling rule or a round robin scheduling rule.

9. The method according to claim 8, wherein the priority scheduling rule is based on a comparison between priority of the video data associated with the plurality of video data packets and priority of auxiliary data associated with the at least one auxiliary data packet.

10. A data transmission method, wherein the method comprises:

receiving a plurality of data packets in a first line active area, wherein the plurality of data packets comprises a plurality of video data packets and at least one auxiliary data packet, the plurality of video data packets are obtained by splitting first line video data, the first line video data is a piece of line video data in video data of a to-be-received video, the video data is data of an image frame of the to-be-received video, the first line active area is a line active area corresponding to the first line video data, and the at least one auxiliary data packet comprises data other than the video data of the to-be-received video, wherein each of the plurality of video data packets comprises a first type identifier, and the first type identifier indicates that a type of data in the respective video data packet is video data, wherein the auxiliary data packet comprises a second type identifier, and the second type identifier indicates that a type of data in the auxiliary data packet is auxiliary data; and determining, based on a type identifier of a first data packet, whether the first data packet is one of the plurality of video data packets or the at least one auxiliary data packet, wherein the first data packet is a data packet in the plurality of data packets.

11. The method according to claim 10, wherein the determining, based on a type identifier of a first data packet, whether the first data packet is one of the plurality of video data packets or the at least one auxiliary data packet comprises:

if the type identifier is the first type identifier, determining that the first data packet is one of the plurality of video data packets; and if the type identifier is the second type identifier, determining that the first data packet is one of the at least one auxiliary data packet.

12. The method according to claim 10, wherein the method further comprises:

receiving the auxiliary data packet in a line blanking area before or after the first line active area; or receiving the auxiliary data packet in a field blanking area between two image frames of the to-be-received video.

13. The method according to claim 11, wherein the method further comprises:

storing the plurality of video data packets in a video data cache space, and storing the at least one auxiliary data packet in an auxiliary data cache space.

14. A data transmission apparatus, wherein the apparatus comprises:

at least one processor; and one or more memories coupled to the at least one processor and storing programming instructions for execution by the at least one processor to cause the apparatus to:

obtain video data of a to-be-transmitted video, wherein the video data is data of an image frame of the to-be-transmitted video;

split first line video data in the video data into a plurality of video data packets, wherein the first line video data is a piece of line video data in the video data; and transmit the plurality of video data packets and at least one auxiliary data packet in a first line active area, wherein the first line active area is a line active area corresponding to the first line video data, and the auxiliary data packet comprises data other than the video data of the to-be-transmitted video, wherein each of the plurality of video data packets comprises a first type identifier, and the first type identifier indicates that a type of data in the respective video data packet is video data, wherein the auxiliary data packet comprises a second type identifier, and the second type identifier indicates that a type of data in the auxiliary data packet is auxiliary data.

15. The apparatus according to claim 14, wherein the auxiliary data packet is obtained based on auxiliary data, and the auxiliary data comprises at least one of audio data, audio rendering data, data related to rendering of the image frame of the to-be-transmitted video, remote control data, subtitle data, bullet comment data, special effect data, or logo data, wherein the remote control data is used to remotely operate the image frame.

16. The apparatus according to claim 14, wherein the programming instructions, when executed by the at least one processor, further cause the apparatus to:

transmit the auxiliary data packet in a line blanking area before or after the first line active area; or transmit the auxiliary data packet in a field blanking area between two image frames of the to-be-transmitted video.

17. The apparatus according to claim 14, wherein the second type identifier is represented by an auxiliary data start (ADS) identifier, an auxiliary data end (ADE) identifier, and an auxiliary data type identifier.

18. The apparatus according to claim 15, wherein the programming instructions, when executed by the at least one processor, cause the apparatus to:

transmit, according to a scheduling rule, the plurality of video data packets and the at least one auxiliary data packet in the first line active area, wherein the scheduling rule indicates a sending sequence of the plurality of video data packets and the at least one auxiliary data packet.

19. The apparatus according to claim 18, wherein the scheduling rule comprises a priority scheduling rule or a round robin scheduling rule.

20. The apparatus according to claim 19, wherein the priority scheduling rule is based on a comparison between priority of the video data associated with the plurality of video data packets and priority of auxiliary data associated with the at least one auxiliary data packet.

* * * * *